(12) United States Patent
Vander Horst

(10) Patent No.: US 7,150,538 B2
(45) Date of Patent: Dec. 19, 2006

(54) DETACHABLE EXTENSION MIRROR

(75) Inventor: John Vander Horst, 10872 Mill Hollow Rd., Littleton, CO (US) 80127

(73) Assignee: John Vander Horst, Littleton, CO (US)

( * ) Notice: Subject to any disclaimer, the term of this patent is extended or adjusted under 35 U.S.C. 154(b) by 42 days.

(21) Appl. No.: 11/027,614

(22) Filed: Dec. 30, 2004

(65) Prior Publication Data

US 2005/0117238 A1    Jun. 2, 2005

Related U.S. Application Data

(63) Continuation-in-part of application No. PCT/US04/000078, filed on Jan. 6, 2004, which is a continuation-in-part of application No. 10/355,417, filed on Jan. 31, 2003, now abandoned.

(51) Int. Cl.
   G02B 7/182     (2006.01)
   B60R 1/06      (2006.01)

(52) U.S. Cl. ............... 359/871; 359/872; 248/467

(58) Field of Classification Search ............. 359/841, 359/871, 872, 881; 248/467, 476, 479, 480
See application file for complete search history.

(56) References Cited

U.S. PATENT DOCUMENTS

| | | | | |
|---|---|---|---|---|
| 918,724 A * | 4/1909 | Austin | ........... | 248/467 |
| 1,006,315 A * | 10/1911 | Toth | ........... | 248/467 |
| 3,750,991 A * | 8/1973 | Ragir | ........... | 248/205.8 |
| 4,043,531 A * | 8/1977 | Green | ........... | 248/537 |
| 4,624,539 A * | 11/1986 | King et al. | ........... | 359/872 |
| 4,863,254 A * | 9/1989 | Dyer | ........... | 359/850 |
| 4,892,400 A * | 1/1990 | Brookes et al. | ........... | 359/865 |
| 4,892,401 A * | 1/1990 | Kittridge et al. | ........... | 359/850 |
| 4,921,340 A * | 5/1990 | Dyer | ........... | 359/864 |
| 5,096,283 A * | 3/1992 | Croteau | ........... | 359/865 |
| 5,296,973 A * | 3/1994 | Burke | ........... | 359/865 |
| 5,438,457 A * | 8/1995 | Moore | ........... | 359/855 |
| 6,619,685 B1 * | 9/2003 | Teague | ........... | 280/477 |

FOREIGN PATENT DOCUMENTS

GB           2209721       *  5/1989

* cited by examiner

*Primary Examiner*—Ricky D. Shafer
(74) *Attorney, Agent, or Firm*—Townsend and Townsend and Crew LLP

(57) ABSTRACT

According to the invention, a detachable extension mirror for mounting on the side-view mirror of the transportation device or vehicle is disclosed. The detachable extension mirror includes a reflective surface, a suction cup, a constraining element and an arm. The suction cup is configured to engage the side-view mirror of the transportation device. A target surface of the side-view mirror defines a first plane and a portion of the suction cup engages the target surface when properly installed. A lip is defined by the distal edge or edges of the portion. A constraining element that engages a back-side of the portion at a point proximate to the lip to force at least part of the lip toward the target surface. An arm couples the suction cup to the reflective surface, where the arm extends away from a second plane, the second plane is defined by a strait-forward direction of the transportation device, the second plane is also defined by being perpendicular to the ground, and the arm extends away from the suction cup at an angle of less than forty-five degrees with respect to either side of the first plane.

20 Claims, 27 Drawing Sheets

DETACHABLE EXTENSION MIRROR

This application claims the benefit of and is a continuation in part PCT Application Serial. No. PCT/U.S. 2004/000078 filed on Jan. 6, 2004, which is a continuation in part of U.S. application Ser. No. 10/355,417 filed on Jan. 31, 2003 now abandoned; and this application is a continuation in part of U.S. Design application Ser. No. 29/220,217 filed on Dec. 27, 2004; all of which are hereby incorporated by reference in their entirety for all purposes.

BACKGROUND OF THE DISCLOSURE

This invention relates to exterior rearview mirror assemblies located on the side of a transportation device, particularly to the addition of a detachable extension mirror unit to extend rearward vision around wide objects blocking a vehicle driver's original rearward view. Wide objects blocking the driver's original rearward view could be campers or other wide loads mounted on a vehicle, trailers attached to the rear of the vehicle, or similar items that obstruct a person's view in or around a transportation device.

Motor vehicles typically come equipped with mirror units secured to the driver's side and the passenger's side for viewing to the side and rear of the vehicle. These side-view mirror units protrude from the side of the vehicle and generally determine the overall width of the vehicle. The side-view mirror units permanently mounted on a vehicle are designed not to protrude too far because it would be easier to hit something with the mirror unit while driving. Many of these side-view mirror units now include a housing around a remotely adjustable reflective surface mounted on the exterior of the vehicle and a remote control input device mounted inside the vehicle. Having such a remote control system allows the driver to adjust both the driver's side and the passenger's side rearward views to accommodate different driver heights and driving positions without having to reach out of the vehicle, leave his driving position, or use an assistant to adjust the mirrors. This remote adjustability is now common and popular.

People can use their vehicles to tow trailers or fifth wheelers that are wider than their vehicle. With pickup trucks one can also install a camper or carry a load that is wider than the truck body. When using a trailer, fifth wheeler, camper or similar object with this additional width, the normal exterior mirrors often become useless because the trailer or similar wide object blocks the primary exterior rearward view. In addition, the view through the interior rearview mirror is usually also blocked by the camper, fifth wheeler, trailer, or similar wide object leaving the driver with no rearward view at all. It is both dangerous and illegal in most places to drive without having a rearward view.

It is known to provide a separate extension mirror unit that attaches to a vehicle and extends further laterally from the vehicle than the original mirror unit so the driver of a vehicle can see rearwards around a wide object attached to the vehicle behind him, such as a truck camper or a trailer. For example, U.S. Pat. No. 4,105,296 to Tomlin discloses an extension mirror unit that provides an extended rearward view to solve the wide trailer problem. The extension mirror unit disclosed by Tomlin can be detached to return the overall width of the vehicle back to its original width. However, mirror units of this type do not provide remote adjustability. It would be complex and costly to add remote adjustability to this type of extension mirror unit.

It is known to provide temporary extension mirror units that: attach to permanently installed side-view mirror units; extend the lateral viewing angle from the vehicle; and detach to return the vehicle to its original width when the extended view is not desired. U.S. Pat. No. 4,111,532 to Budish discloses a mirror unit that mounts over an existing exterior mirror unit to give an extended rearward view around wide objects. The extension mirror mounting configuration disclosed by Budish cannot provide remote adjustability because it is based on attachment elements that will not fit in the narrow gap between the remotely-adjustable reflective surface in the existing mirror and the stationary housing around this reflective surface in typical remotely-adjustable mirror units.

U.S. Pat. No. 4,892,400 to Brookes et al, U.S. Pat. No. 4,892,401 to Kittridge et al, U.S. Pat. No 4,921,340 to Dyer, U.S. Pat. No. 5,096,283 to Croteau, and U.S. Pat. No. 5,870,236 to Barksdale disclose different types of temporary mirror units that attach to existing mirror units to provide an extended rearward view. However, when used with remotely-adjustable existing mirror units, these detachable extension mirror units are fixed to the stationary housing, not to the remotely-adjustable reflective surface and therefore do not provide remote adjustability of the extension reflective surface.

It is known to permanently attach a replacement reflective surface to an original reflective surface to repair the original reflective surface. In this case, if the original reflective surface was remotely adjustable, the replacement reflective surface will also become remotely adjustable. However, this configuration does not extend rearward vision around wide objects. This idea cannot be used to create an adjustable extension mirror because most modern side view mirror units have adjustable reflective surfaces located inside a stationary housing and separated from this housing by a narrow gap. Also, the repair of one reflective surface by another is designed to be permanent. Therefore, the attachment method used is permanent.

It is known to have a compound mirror assembly comprising multiple mirrors surfaces that move together. U.S. Pat. No. 4,907,871 to Hou discloses an exterior rearview mirror assembly containing three mirror elements that adjust together. U.S. Pat. No. 6,024,459 to Lewis, U.S. Pat. No. 6,116,743 to Hoek and U.S. Patent Application Publication No. 2002/0072026 to Lynam et al disclose exterior rearview mirror assemblies containing two elements that adjust together. These compound mirror assemblies allow more than one mirror to be adjusted at once. Some of these configurations are also remotely adjustable.

It is known to have remotely adjustable side view mirror units that can move laterally from a position close to the vehicle to a position further out from the vehicle when an extended rearward image is wanted. In some cases, such remotely adjustable extension mirror systems even have remote control movement of the reflective surface from the inboard (non-towing) to an outboard (towing) position. For example, U.S. Pat. No. 4,558,930 to Deedreek discloses such an extension mirror system.

However, U.S. Pat. No. 4,907,871, U.S. Pat. No. 6,024, 459, U.S. Pat. No. 6,116,743, U.S. Pat. No. 4,558,930, and U.S. Patent Application Publication No. 2002/0072026 all disclose mirror units that are used as or substitute for original equipment mirror assemblies and are subsequently permanently attached. In the automotive aftermarket, replacing an original equipment mirror assembly is quite difficult and typically involves taking off the interior door panel. If the extension mirror unit is to be remotely controlled, a new remote control input device compatible with the rest of the extension mirror unit would typically also be installed in the vehicle. Consequently, people who did not buy specialized "towing mirrors" when they purchased their vehicle prefer add-on mirrors that can be attached in a simple way to their existing side view mirrors. Many motor vehicle buyers who anticipate that they may want extension mirrors may still prefer to use detachable extension mirrors because these are generally significantly less expensive than the incremental cost of buying an original equipment or dealer-installed "towing mirror" that can be manually or automatically moved from an inboard to an extended position.

In addition, add-on extension mirrors can fall off and get lost or damaged during operation as a result of high wind loads or poor installation. It is not known to have a secondary attachment system as a backup, such as a safety cord, in case the primary extension mirror unit mounting fails.

BRIEF DESCRIPTION OF THE DRAWINGS

The present disclosure is described in conjunction with the appended figures.

Figure 1:
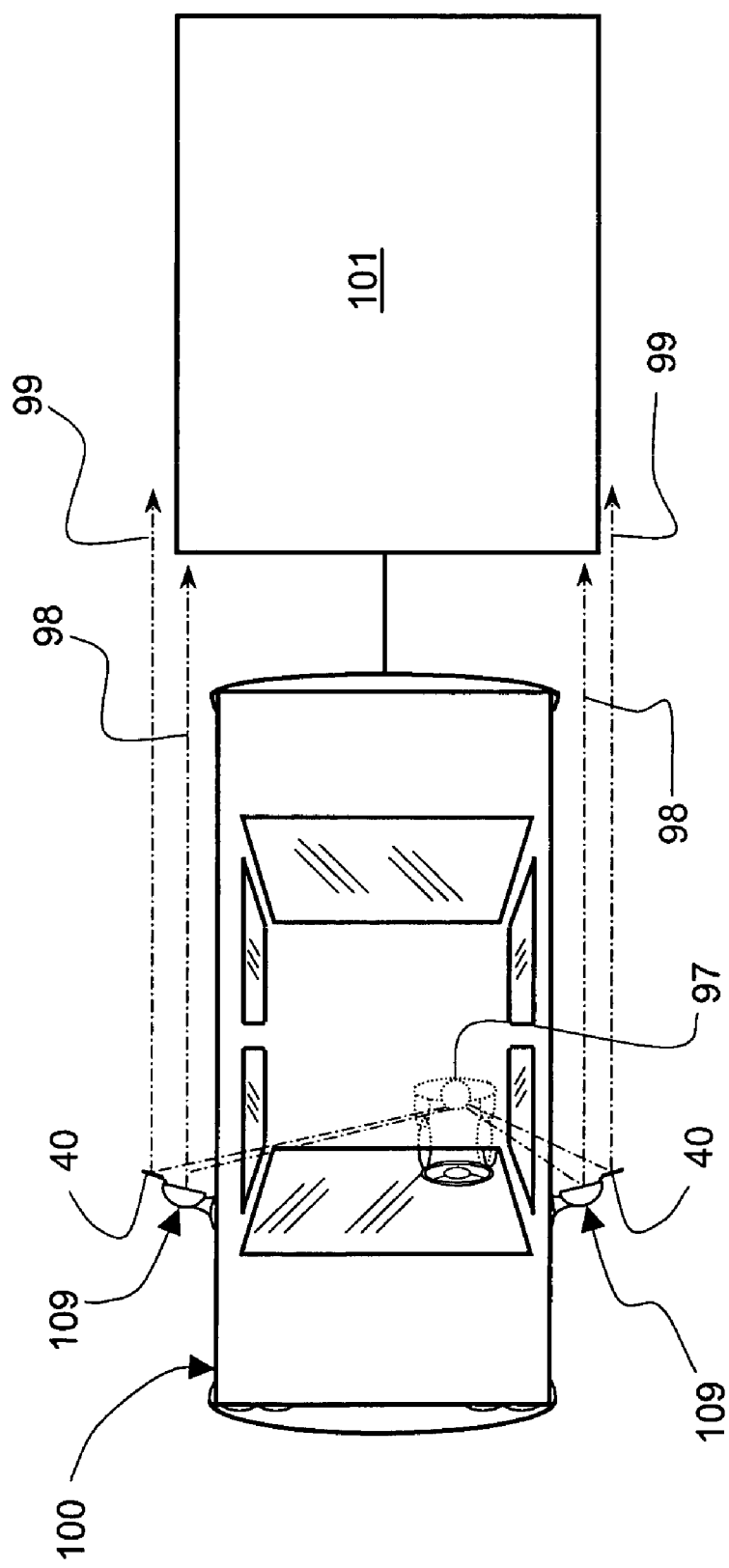
FIG. 1 is a top view of a vehicle and a wide trailer.

In the appended figures, similar components and/or features may have the same reference label. For items with the same reference label, the description is applicable to any one of the similar components.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In one embodiment, the present disclosure provides a detachable extension mirror for mounting on the side-view mirror of the transportation device or vehicle. The detachable extension mirror includes a reflective surface, a suction cup, a constraining element and an arm. The suction cup is configured to engage the side-view mirror of the transportation device. A target surface of the side-view mirror defines a first plane and a portion of the suction cup engages the target surface when properly installed. A lip is defined by the distal edge or edges of the portion. A constraining element that engages a back-side of the portion at a point proximate to the lip to force at least part of the lip toward the target surface. An arm couples the suction cup to the reflective surface, where the arm extends away from a second plane, the second plane is defined by a strait-forward direction of the transportation device, the second plane is also defined by being perpendicular to the ground, and the arm extends away from the suction cup at an angle of less than forty-five degrees with respect to either side of the first plane.

In another embodiment, the present disclosure provides a detachable extension mirror for mounting on the side-view mirror of the transportation device or vehicle. The detachable extension mirror includes a mirror housing, a suction cup, a constraining element, and an arm. The mirror housing includes a reflective surface, which is coupled the suction cup with the arm. The suction cup is configured to engage the side-view mirror of the transportation device. A portion of the suction cup engages a target surface of the side-view mirror when properly installed. A lip is defined by the distal edge or edges of the portion, where the constraining element engages a point proximate to the lip to force at least part of the lip toward the target surface. The arm extends away from the suction cup. The arm and the mirror housing together weigh less than ten ounces.

In yet another embodiment, the present disclosure provides a detachable extension mirror for mounting on the side-view mirror of the transportation device or vehicle. The detachable extension mirror including a mirror housing, a suction cup, a constraining element and an arm. The mirror housing includes a reflective surface. The suction cup is configured to engage the side-view mirror of the transportation device. A portion of the suction cup engages a target surface of the side-view mirror when properly installed. A lip is defined by the distal edge or edges of the portion. The constraining element engages a point proximate to the lip to force at least part of the lip toward the target surface. The arm couples the suction cup to the reflective surface, where the arm extends away from the suction cup. A first minimum circumference of the arm is less than eighty percent of a second minimum circumference of the reflective surface.

Referring to FIG. 1, a transportation device is shown at 100. A wide trailer, shown at 101, is attached to the rear of the transportation device 100. Original equipment side-view mirror units (side-view mirror units) are shown at 108. The side-view mirror units 108 include reflective surfaces that provide primary exterior rearward views, shown at 98, to a driver, shown at 97. The primary exterior rearward views 98 are acceptable when the transportation device 100 is not pulling a trailer 101 wider than the transportation device 100 because they allow the driver 97 to see behind the side of the transportation device 100 and because the right and left primary exterior rearward views 98 can converge at some point behind the transportation device 100.

Also referring to FIG. 1, the primary exterior rearward views 98 cannot show the sides of the wide trailer 101 or anything directly behind the wide trailer 101 to the driver 97 because the wide trailer 101 is wider than the distance between the outermost portions of the reflective surfaces of the side-view mirror units 108.

Also referring to FIG. 1, non-obscuring extension reflective surfaces, shown at 40, have been located further from the side of the transportation device 100 than the outermost portion of the reflective surfaces of the side-view mirror units 108. The non-obscuring extension reflective surfaces 40 provide extended rearwards views, shown at 99, that include views of the sides of the wide trailer 101. Although there is still a blind spot directly behind the wide trailer 101, the size of this blind spot decreases the further one is behind the wide trailer 101. By locating the non-obscuring reflective surfaces 40 further from the side of the transportation device, the size of the blind spot decreases, but the distance between the non-obscuring reflective surfaces 40, and therefore the effective width of the transportation device 100, increases.

Also referring to FIG. 1, the non-obscuring extension reflective surfaces 40, are called "non-obscuring" because the extension surfaces do not block the driver 97 from seeing the primary exterior rearward views 98. Extended rearward views 99 can be provided by:

fully obscuring extension reflective surfaces, that block all the primary exterior rearwards view 98;

partially obscuring extension reflective surfaces, that block some of the primary exterior rearwards view 98; or non-obscuring extension reflective surfaces, block none of the primary exterior rearwards view 98.

Figure 5:
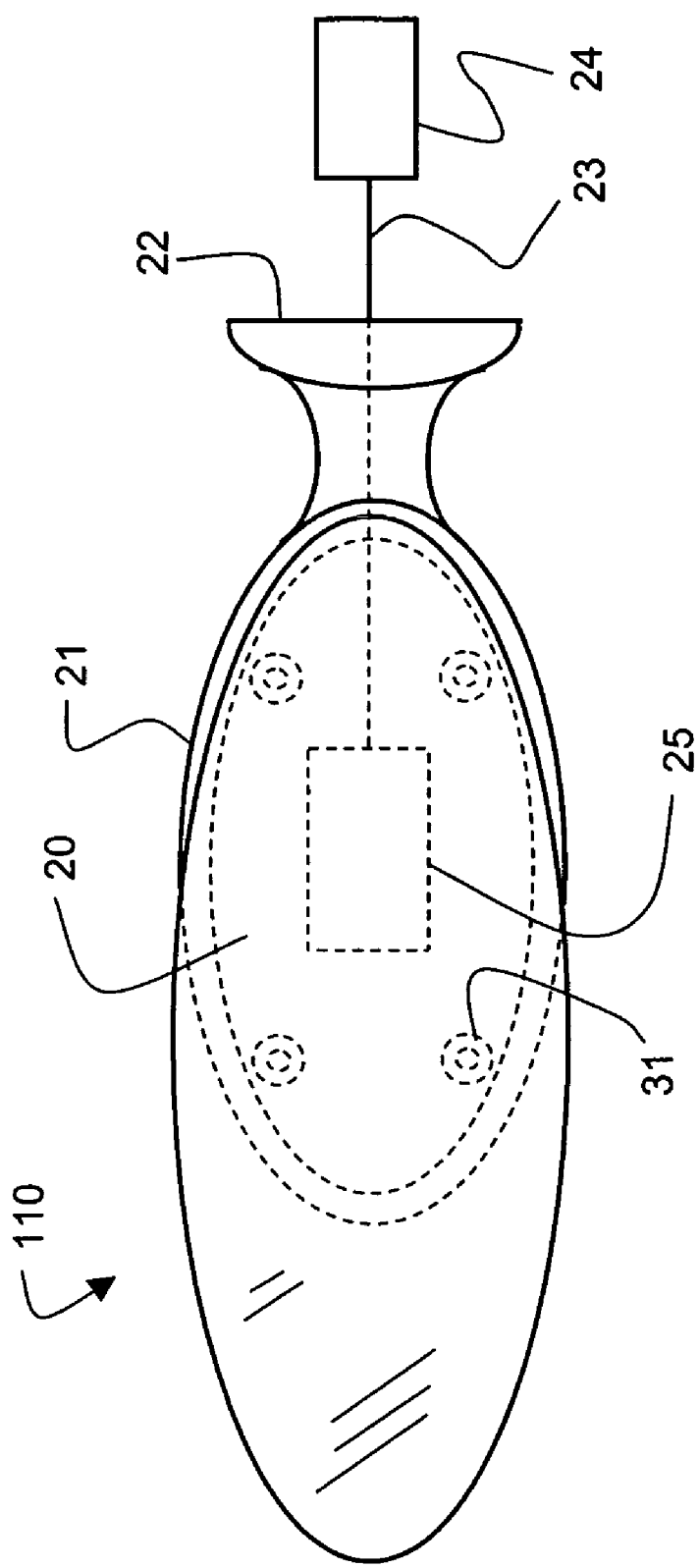
FIG. 5 is a rear view of the suction-cup remotely adjustable extension mirror system.

The invention described here can have non-obscuring extension reflective surfaces 40, partially obscuring extension reflective surfaces, or fully obscuring extension reflective surfaces shown at 30 in FIG. 5. Although a partially obscuring reflective surface is not illustrated, the concept and implementation can be understood by anyone skilled in the art.

By the term surface, it should be understood that the surface need not be flat. The term is intended in a broader context and also encompasses convex, concave, curved, angular and compound shapes. By the term reflective, it should be understood that this includes partially reflective or tinted objects that do not return the full intensity of the image or the full color spectrum of the image that bounces off of them.

Figure 2:
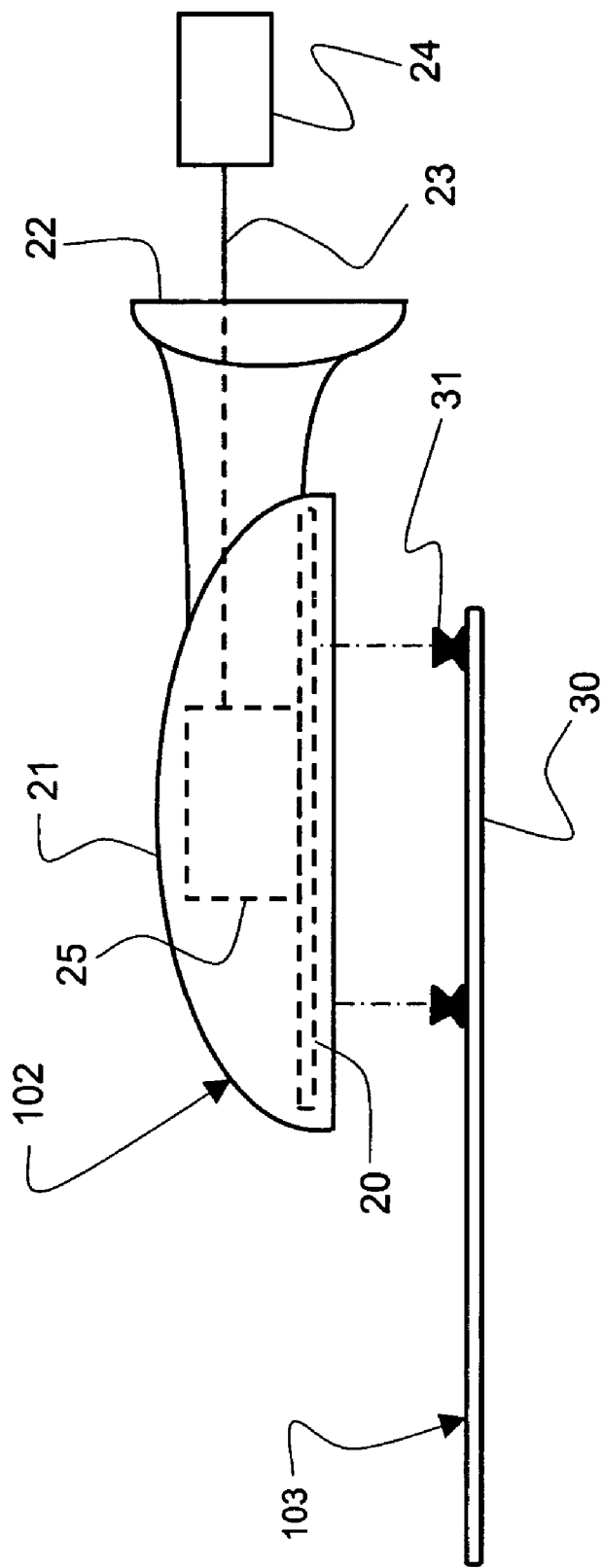
FIG. 2 is an exploded top view of a suction-cup remotely adjustable extension mirror system comprising a remotely adjustable original-equipment side-view mirror unit (remotely-adjustable side-view mirror unit) and a suction-cup detachable obscuring extension mirror unit.
Figure 3:
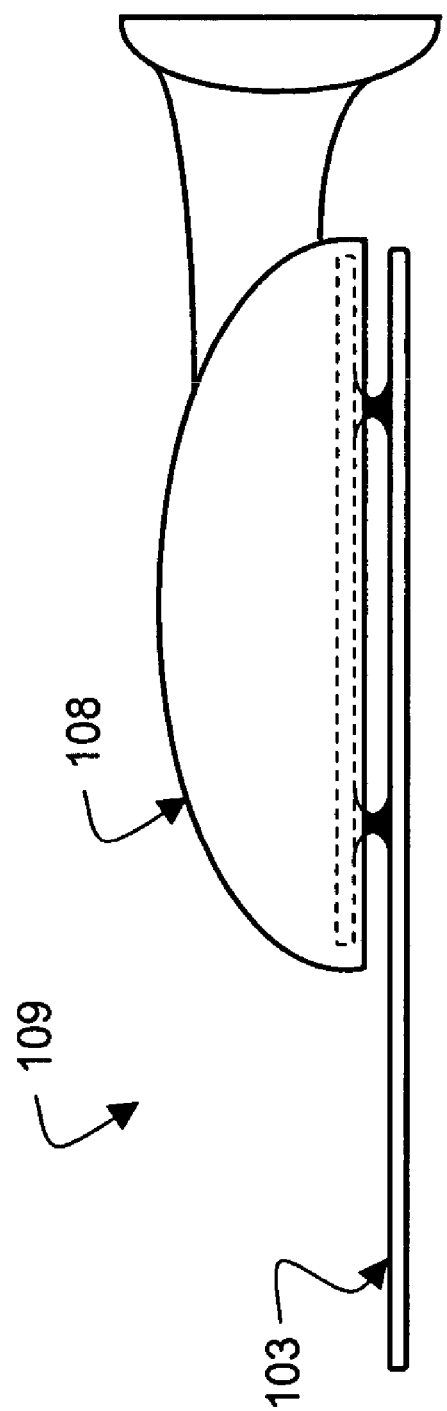
FIG. 3 is a top view of a detachable extension mirror system comprising an original-equipment side-view mirror unit (side-view mirror unit) and the suction-cup detachable obscuring extension mirror unit.

Referring to FIG. 1, FIG. 2 and FIG. 3, a remotely adjustable original equipment side-view mirror unit (remotely-adjustable side-view mirror unit) is shown at 102 in FIG. 2. The remotely adjustable side-view mirror unit 102 is a subtype of the side-view mirror unit shown at 108 in FIG. 1 and FIG. 3. Both the remotely adjustable side-view mirror unit 102 and the side-view mirror unit 108 include a side-view mirror housing shown at 21 and a first reflective surface, shown at 20. The side-view mirror housing 21 includes a base member shown at 22 for securing the side-view mirror unit 108 or the remotely adjustable mirror unit 102 to the transportation device, shown at 100 in FIG. 1. The remotely adjustable mirror unit 102 also includes a remote input device, shown at 24, and an actuator, shown at 25. The remote input device 24 is external to the side-view mirror housing 21 and is typically mounted inside the vehicle within reach of the driver, shown at 97 in FIG. 1. The actuator 25 is typically mounted inside the side-view mirror housing 21. The actuator 25 typically imparts a pivoting motion to the first reflective surface 20. This pivoting motion adjusts the primary exterior rearward view shown as 98 in FIG. 1.

Referring to FIG. 1 and FIG. 2 the driver 97 adjusts the original rearward view 98 by interacting with the remote input device 24, which transmits force, power, or signals via a transmission element, shown at 23 in FIG. 2, to the actuator 25 which moves the first reflective surface 20.

Referring to FIG. 3 a suction-cup detachable obscuring extension mirror unit, shown at 103, has been attached to the side-view mirror unit 108, making a detachable extension mirror system, shown at 109.

Figure 4:
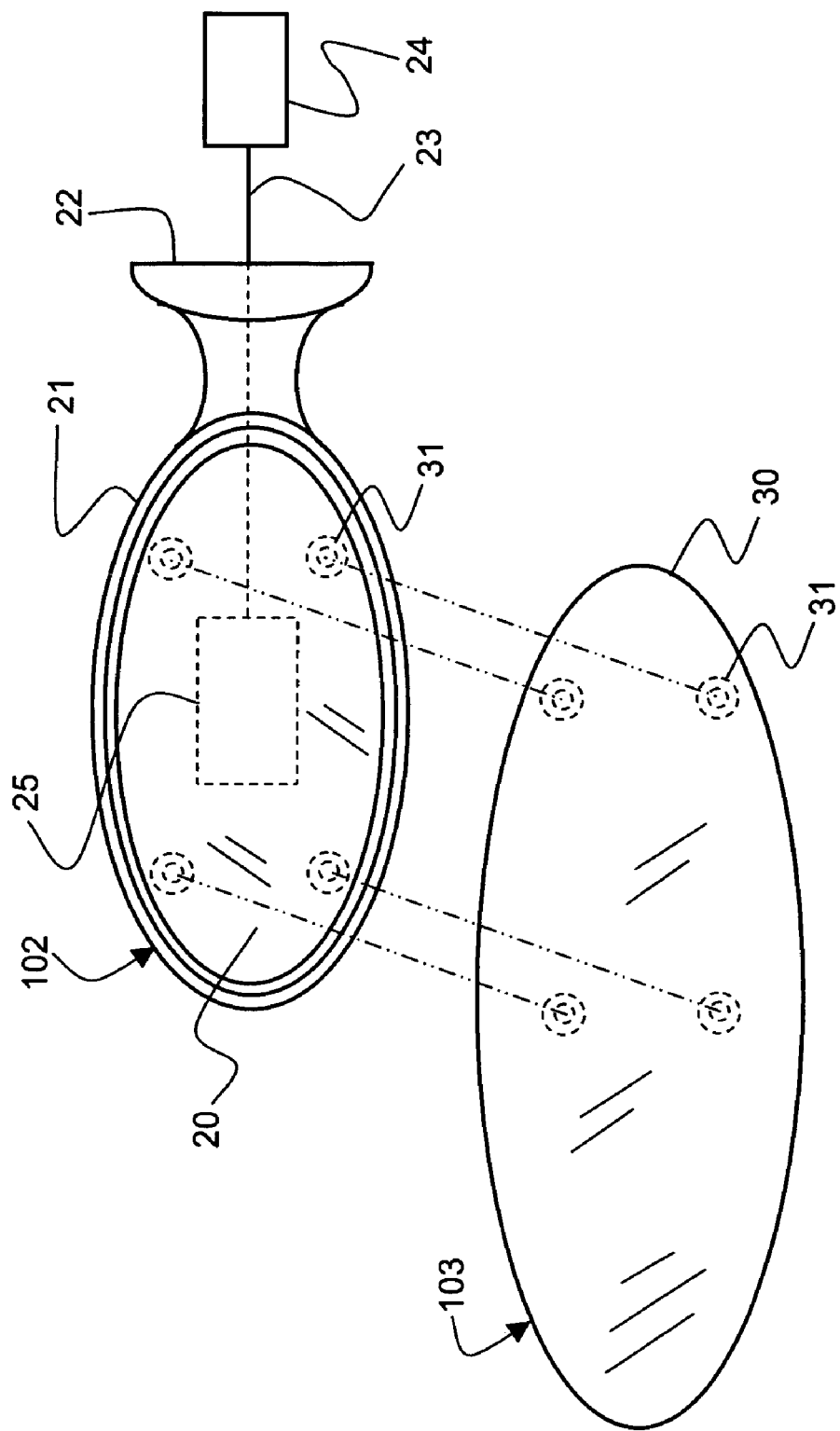
FIG. 4 is an exploded rear view, taken from the side of a motor vehicle looking forwards, of the suction-cup remotely adjustable extension mirror system.

Referring to FIG. 2 and FIG. 4 the suction-cup detachable obscuring extension mirror unit is shown at 103. The suction-cup detachable obscuring detachable extension mirror unit 103 includes an obscuring extension reflective surface, shown at 30, made of a clear material including, but not limited to glass, polycarbonate, and acrylic, with a reflective coating on the side opposite the visible side of the obscuring extension reflective surface 30. The suction-cup detachable obscuring extension mirror unit 103 also includes vacuum suction cups, shown at 31 that are attached to the non-visible side of the obscuring extension reflective surface 30 by means of adhesives, hook and loop fasteners (Velcro™ made by Velcro Industries) or some equivalent. Although the detail for attaching the vacuum suction cups 31 to the obscuring reflective surface 30 is not illustrated, it is capable of being understood by anyone skilled in the art. The connection between the vacuum suction cups 31 and the obscuring reflective surface 30 can be permanent or detachable, direct or indirect. The attachment can be made using a variety of different materials including, but not limited to, adhesives, fasteners, and various other mechanical elements or adapters between the vacuum suction cups 31 and the non-visible side of the obscuring reflective surface 30.

Figure 6:
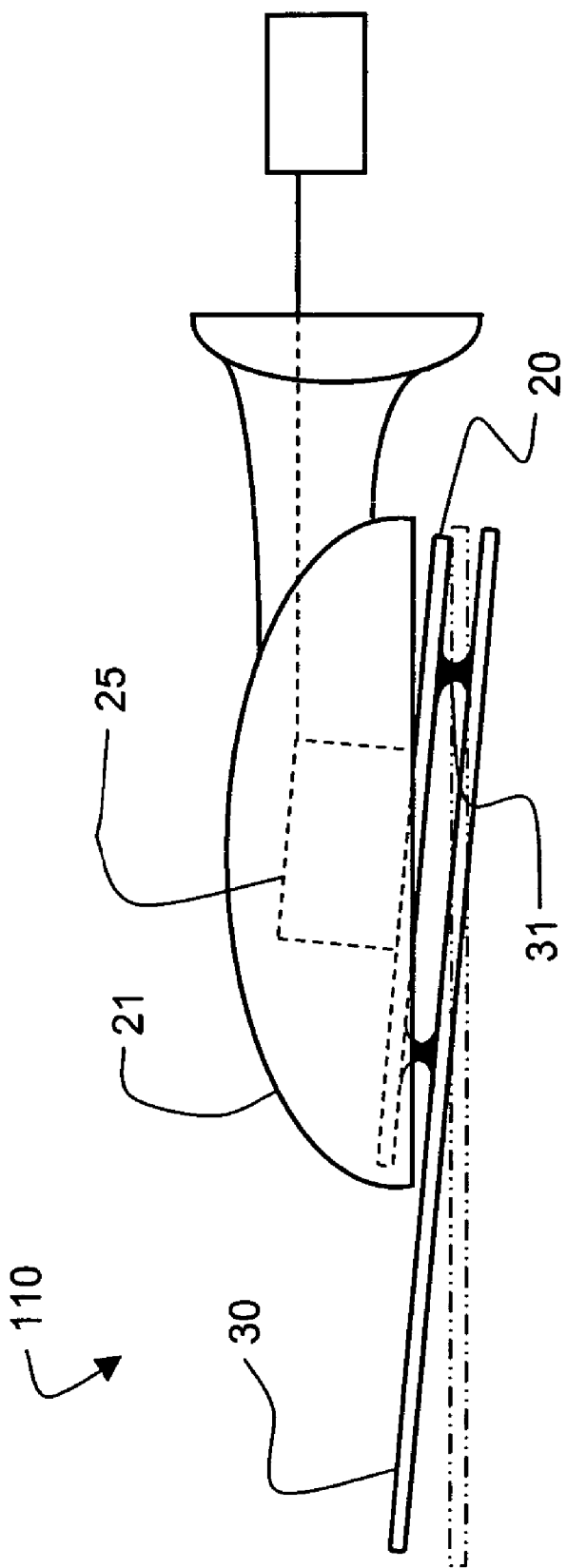
FIG. 6 is a top view of the suction-cup remotely adjustable extension mirror system showing the suction-cup detachable obscuring extension mirror unit pivoted about the vertical axis through movement of the original reflective surface.

FIG. 6 shows typical motion of the first reflective surface 20 and how this is coupled to the obscuring extension reflective surface 30 in a suction-cup remotely adjustable extension mirror system, shown at 110. It should be known that the first reflective surface 20 is also referred to as the target surface. In the suction-cup remotely adjustable extension mirror system 110, the vacuum suction cups 31 serve two functions:

the vacuum suction cups 31 are detachable first attachment elements, providing a first method by which the obscuring extension reflective surface 30 is attached to the first reflective surface 20; and the vacuum suction cups 31 are movement offset elements that allow the first reflective surface 20 to go through its full range of motions and all potential positions without creating interference between the obscuring extension reflective surface 30 and any element of the remotely-adjustable side-view mirror unit (shown as 102 in FIG. 2), especially the side-view mirror housing 21. It is important that any movement offset elements create enough spacing between the first reflective surface 20 and the other elements of the suction-cup remotely-adjustable extension mirror system 110 to provide a full range of motion of the suction-cup remotely-adjustable extension mirror system 110 in response to movement of the first reflective surface 20.

Referring to FIG. 2 and FIG. 4, the first reflective surface 20 sits inside the space enclosed by the side-view mirror housing 21 for at least some possible positions in most remotely-adjustable side-view mirror units, 102. The first reflective surface 20 is typically separated from the side-view mirror housing 21 by a narrow gap, called a mirror gap. By geometry, any extension reflective surface—whether it is obscuring, non-obscuring or partially obscuring—can only provide an extended image, 99 in FIG. 1, if is has part of its reflective surface located farther outboard of the transportation device than the envelope created by the potential positions of the first reflective surface 20. It is also important that the first reflective surface 20 and any extension reflective surface are connected in a way that does not create interference with the side-view mirror housing 21 for all ranges of motion of an extension mirror system.

Further referring to FIG. 4, vacuum suction cups 31 adheres to the first reflective surface 20 with a force great enough to support the suction-cup detachable obscuring extension mirror unit 103. The suction-cup detachable obscuring extension mirror unit 103 shown in FIG. 4 uses four vacuum suction cups 31 made of polyvinyl chloride (PVC). It is possible to use a different number of vacuum suction cups 31 to give the coupling required. It is possible to use vacuum suction cups 31 made of other materials. It is also possible to make a more complex attachment system for attaching an extension mirror unit to an side-view mirror unit, 108 in FIG. 3, or to the transportation device, 100 in FIG. 1, in a way that reduces the forces placed onto the first reflective surface 20 by the extension mirror unit while still allowing the motion of the first reflective surface 20 to couple to and adjust the obscuring extension reflective surface 30 or a non-obscuring extension reflective surface 40 in FIG. 1.

Referring also to FIG. 4, installation of the suction-cup detachable obscuring extension mirror unit 103 to the remotely-adjustable side-view mirror unit 102, is accomplished by first cleaning the first reflective surface 20 with a mirror cleaner to ensure long-term adhesion of the vacuum suction cups 31 in one embodiment. Installation is performed accurately enough to give a good appearance and not to create interference with any part of the remotely adjustable side-view mirror unit 102, or the transportation device, 100 in FIG. 1. No tools or specialized expertise are required to install the suction-cup detachable obscuring extension mirror unit 103 to the remotely adjustable side-view mirror unit, 102.

Referring to FIG. 4 and FIG. 6, detachment of the suction-cup detachable obscuring extension mirror unit 103 from the remotely-adjustable side-view mirror unit 102 is accomplished by pivoting the first reflective surface 20 successively to positions where each vacuum suction cup 31 is accessible and then slipping a knife blade between the first reflective surface 20 and the lip of each vacuum suction cup 31.

Figure 7:
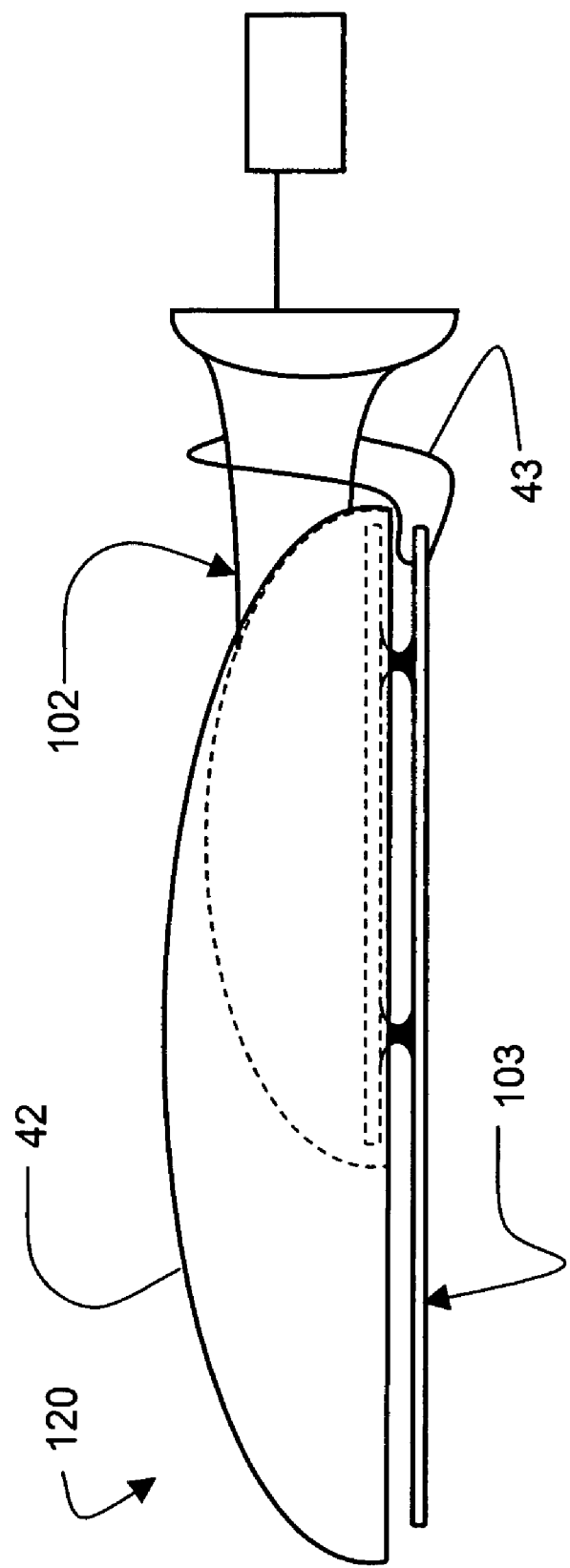
FIG. 7 is a top view of an enhanced extension mirror system comprising the remotely adjustable side-view mirror unit, the suction-cup detachable obscuring extension mirror unit, an add-on wind deflector, and a safety attachment element.
Figure 8:
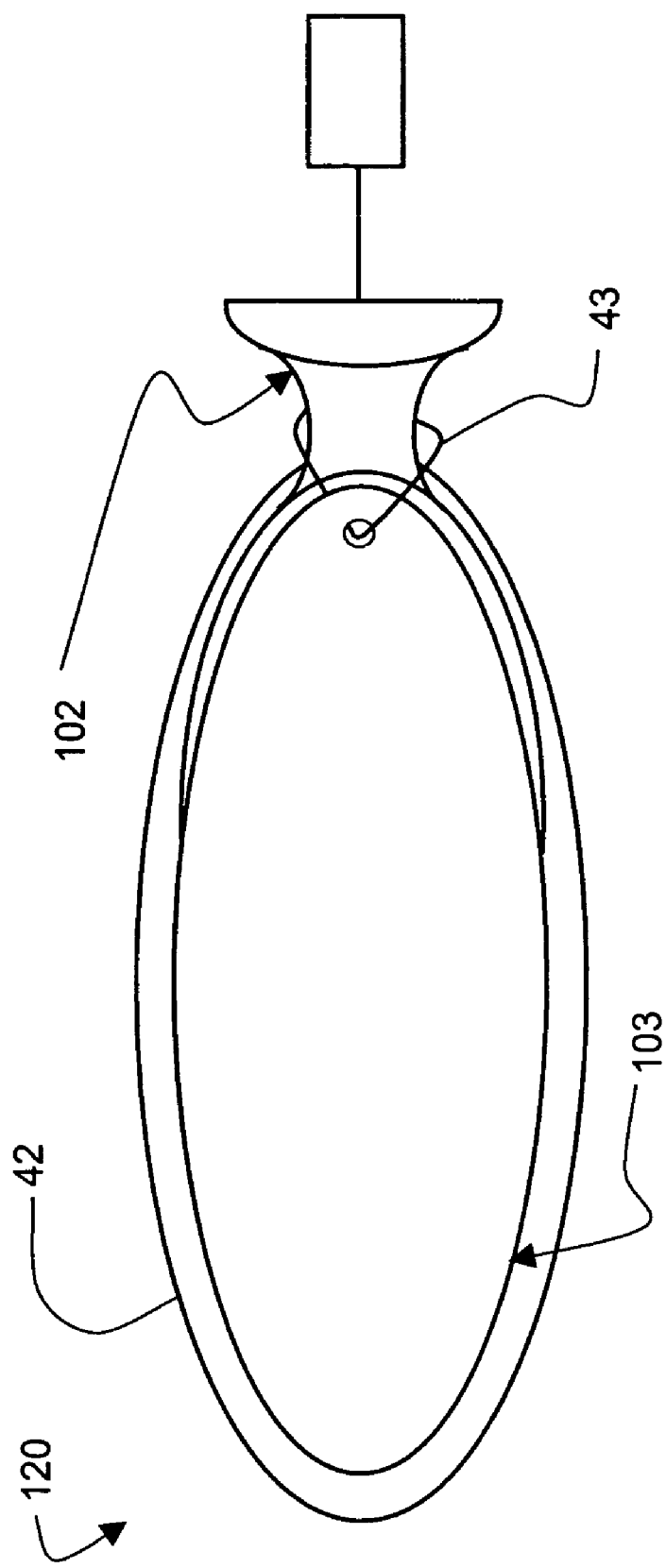
FIG. 8 is a rear view of the enhanced extension mirror system.

Referring to FIG. 7 and FIG. 8, a wind-shielded safety-corded remotely adjustable extension mirror system (enhanced extension mirror system) is shown at 120. This enhanced extension mirror system 120 includes all of the elements of the suction-cup remotely adjustable extension mirror system 110 described previously and also includes an add-on wind deflector, shown at 42, and a safety attachment element, shown at 43. The enhanced extension mirror system uses the safety attachment element 43 to connect the suction-cup detachable obscuring extension mirror unit, shown at 103 to the remotely adjustable side-view mirror unit, shown at 102. The add-on wind deflector 42:

reduces the wind forces on the suction-cup detachable obscuring extension mirror unit 103;

reduces the possibility that the suction-cup detachable obscuring extension mirror unit 103 is accidentally bumped; and improves the appearance of the enhanced extension mirror system 120.

The safety attachment element 43 can be used as a backup in case attachment of the primary attachment element or elements, (e.g. vacuum suction cups 31 in FIG. 6) fails. Although the safety attachment element 43 is shown as connecting the suction-cup detachable obscuring extension mirror unit 103 to the remotely-adjustable side-view mirror unit 102, the safety attachment 43 can also be used to connect any embodiment of an extension mirror unit to some other part of the transportation device, shown as 100, in FIG. 1. The alternative materials and mountings of this safety attachment element 43 are not critical and can be understood and implemented by anyone skilled in the art.

Referring to FIG. 9, FIG. 10, FIG. 11, and FIG. 12 a mirror-gap-element remotely adjustable extension mirror system is shown at 130. The difference between the mirror-gap-element remotely adjustable extension mirror system 130 and the suction-cup remotely adjustable extension mirror system, 110 in FIG. 5 and FIG. 6, is that the vacuum suction cups 31 in FIG. 5 and FIG. 6 have been replaced by mirror-gap attachment elements, shown at 52, and alternate movement offset elements, shown at 53. Instead of using one type of element (vacuum suction cups 31) for both the attachment and the offset function, as was the case in the suction-cup-based extension mirror systems shown in FIG. 1, FIG. 2, FIG. 3, and FIG. 4, the mirror-gap-element remotely-adjustable extension mirror system 130 separates these functions into two types of elements, mirror-gap attachment elements 52 and alternate movement offset elements 53.

Figure 9:
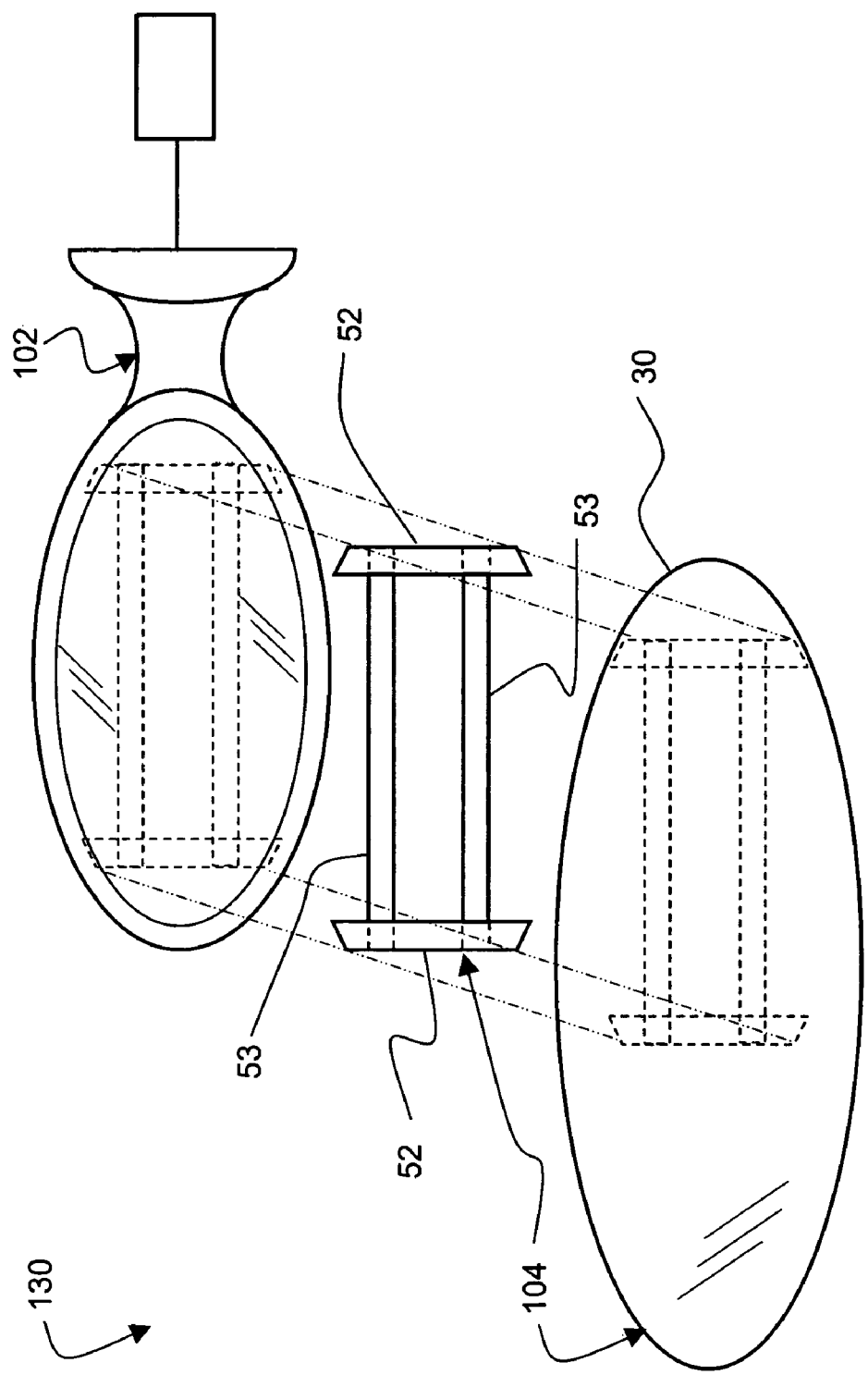
FIG. 9 is an exploded rear view of a mirror-gap-element remotely-adjustable extension mirror system comprising the remotely-adjustable side-view mirror unit and a mirror-gap-element detachable obscuring extension mirror unit that uses an alternate movement offset element and a mirror-gap attachment element.
Figure 11:
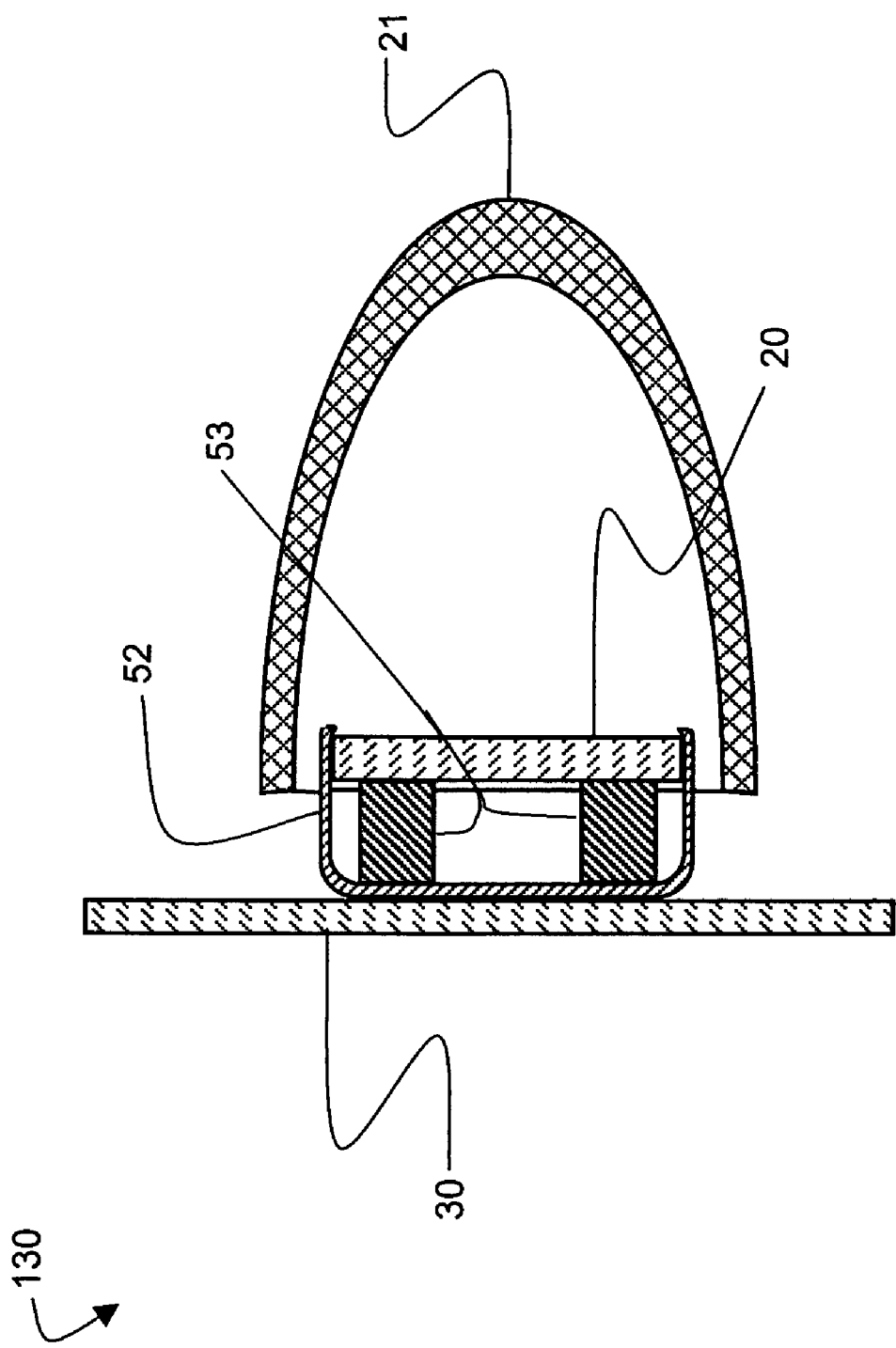
FIG. 11 is a sectional view of the mirror-gap-element remotely adjustable extension mirror system taken at section A—A from FIG. 10.
Figure 12:
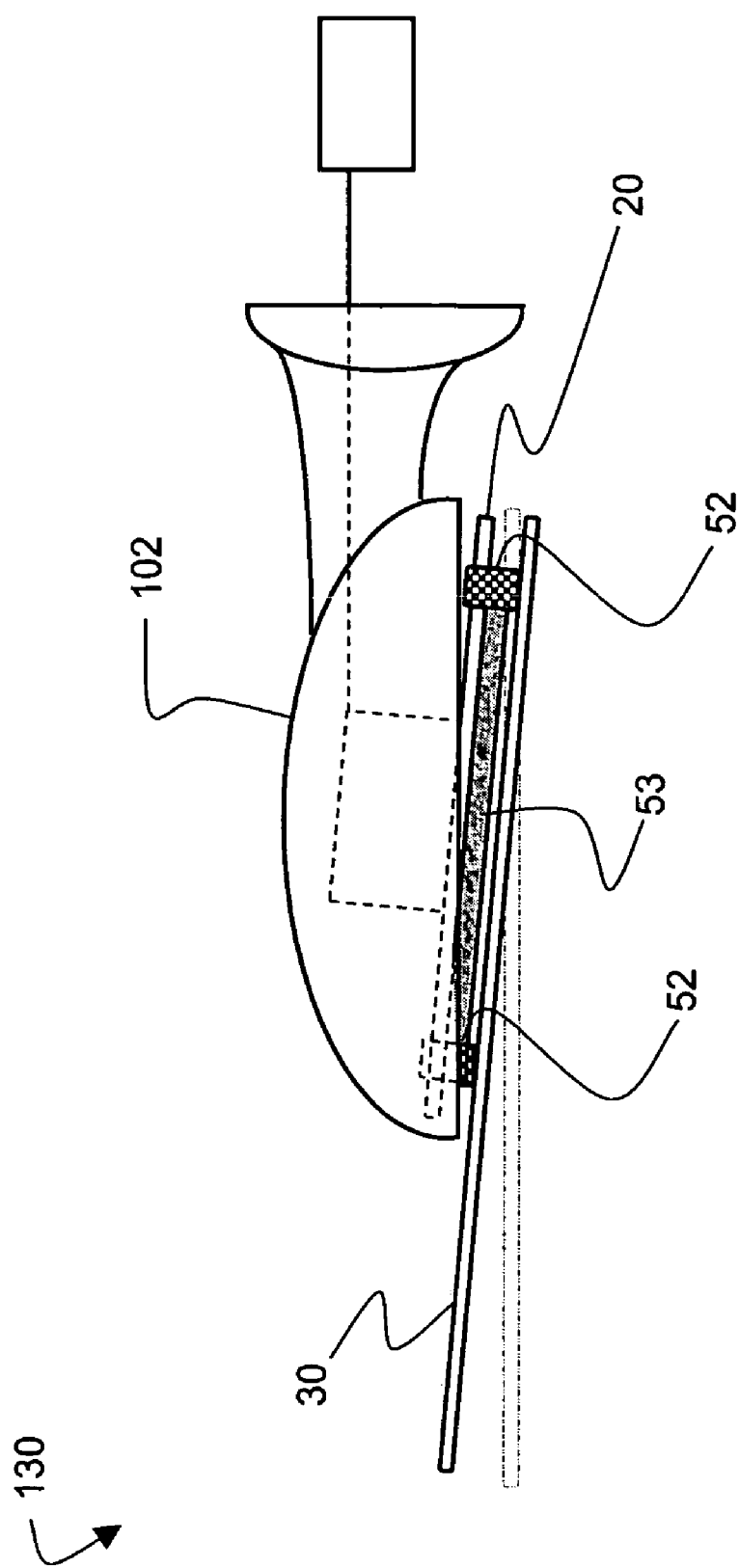
FIG. 12 is a top view of the mirror-gap-element remotely adjustable extension mirror system showing the mirror-gap-element detachable obscuring extension mirror unit pivoted about the vertical axis through movement of the original reflective surface.

Referring to FIG. 9, FIG. 11, and FIG. 12 the mirror gap attachment element is shown at 52. In this embodiment, the mirror-gap attachment elements 52 are made of a spring steel that has been formed into a "U-shape". Because:

the gap between the first reflective surface 20 and the side-view mirror housing 21 is minimal in most side-view mirror units;

the first reflective surface 20 moves relative to the side-view mirror housing 21 in remotely-adjustable side-view mirror units; and a detachable system like the present invention should be designed to be usable with a variety of shapes and sizes of side-view mirror units, the mirror gap attachment element 52 has been designed to be of the thinnest possible commercially-feasible material that gives a good clamping force on the edges of the first reflective surface 20 with minimal requirement for any retention on the side opposite the viewing side of the first reflective surface 20.

Also referring to FIG. 9, FIG. 11 and FIG. 12, the alternate movement offset element 53 establishes the necessary distance between the first reflective surface 20 and the obscuring extension reflective surface 30. Although the alternate movement offset elements 53 shown in this figure are rectangular cross-section beams, these alternate movement offset elements 53 can be made in any of a variety of geometries out of any of a variety of materials using any of a variety of direct or indirect attachment methods to the obscuring reflective surface 30 so long as the alternate movement offset elements 53 accomplish the objective of resting on the first reflective surface 20 and provide sufficient spacing between the obscuring reflective surface 30 and the first reflective surface 20 so that there is no interference between the obscuring reflective surface 30 and the side-view mirror housing 21 for all potential positions of the first reflective surface 20 relative to the side-view mirror housing 21. It is possible to make a single element that combines the functions of the alternate spacing element 53 and the mirror gap attachment element 52.

Referring to FIG. 9, FIG. 10, FIG. 11 and FIG. 12, installation of the mirror-gap-element detachable obscuring extension mirror unit 104 to the remotely adjustable side-view mirror unit 102 can be accomplished by pressing the alternate extension mirror unit over the first reflective surface 20. If there is any difficulty getting any of the legs of the mirror gap attachment elements 52 to seat properly, it is possible to move the first reflective surface 20 to a position where one can access the legs of the mirror gap attachment elements 52 to help seat them. Detachment of the mirror-gap-element detachable obscuring extension mirror unit 104 is accomplished by moving the first reflective surface 20 successively to positions where the each leg of each mirror gap attachment element 52 is accessible and then slipping a thin knife blade between the leg of the mirror gap attachment element 52 and the edge of the first reflective surface 20 while pulling the mirror-gap-element detachable obscuring extension mirror unit 104 away from the first reflective surface 20.

Figure 13:
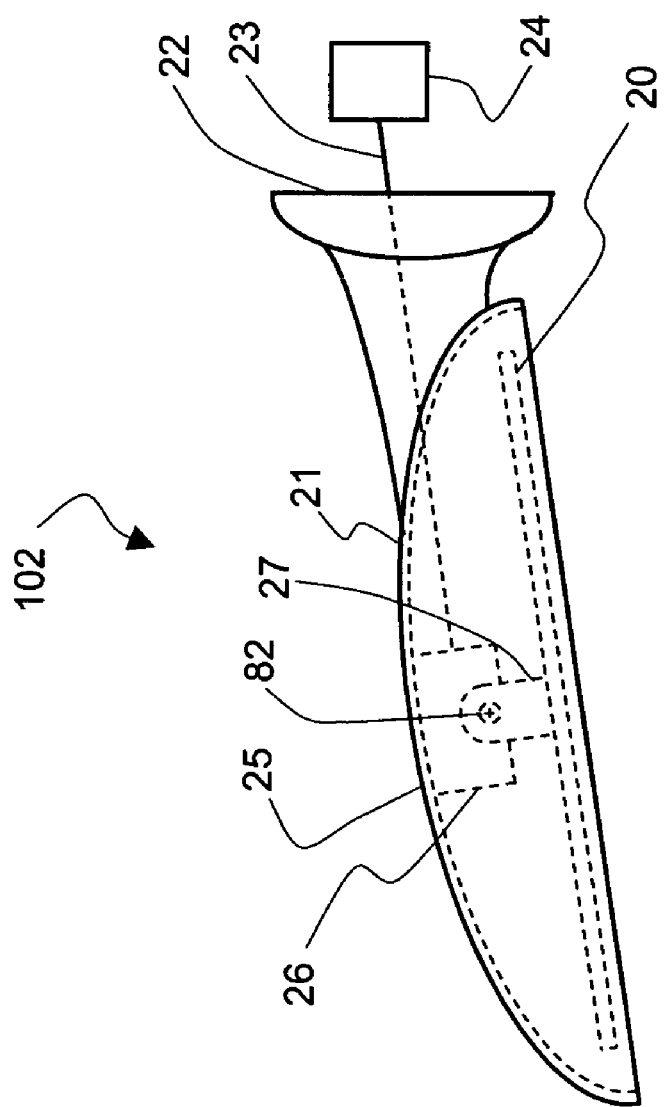
FIG. 13 is a top view of a side-view mirror unit showing more detail of the actuator.

Referring to FIG. 13, the remotely adjustable side view mirror unit is shown at 102. The remotely adjustable side-view mirror unit 102 is the same as previously described except that the actuator shown at 25 has now been separated into three subcomponents: an actuator housing shown at 26; an actuator pivot shown at 82; and an actuator attachment element shown at 27. The actuator housing 26 is fixedly attached to the side-view mirror housing 21. The first reflective surface 20 is fixedly attached to the actuator attachment element 27. By the term pivot it should be understood that the element, action or point in space need not occur at an end. The term is intended in a broader context and also encompasses a location, surface, or element about which any type of rotational movement occurs. The first reflective surface 20 moves about the actuator pivot 82 when a driver, 97 in FIG. 1, adjusts the original rearward view, 98 in FIG. 1, by interacting with a remote input device, shown at 24, which transmits force, power, or signals via a transmission element, shown at 23, to the actuator 25 which causes the actuator attachment element 27 and the first reflective surface 20 to move relative to the actuator housing 26 and the side-view mirror housing 21. The pivoting motion that occurs about the actuator pivot 82 can be separated into motion about perpendicular axes that intersect at the actuator pivot 82. For purpose of explaining the present invention, rotation of the first reflective surface 20 about the vertical axis and a rotation of the first reflective surface about a horizontal axis perpendicular to the vertical axis and parallel to the plane of the first reflective surface 20 are of greatest interest and are referred to in this document as vertical rotation of the first reflective surface and horizontal rotation of the first reflective surface 20.

Figure 14:
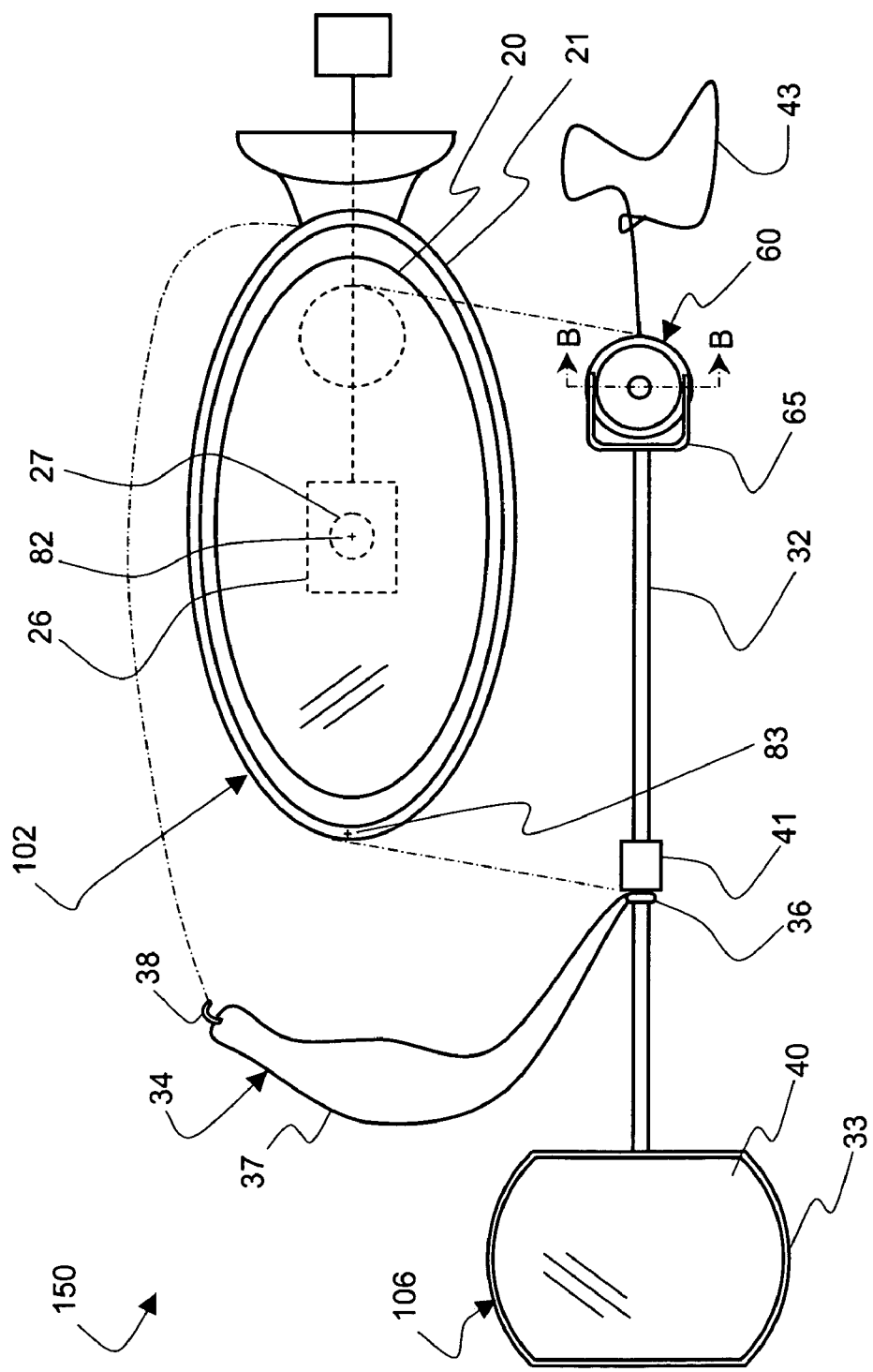
FIG. 14 is an exploded rear view, taken from the side of a motor vehicle looking forwards, of a multiple-pivot remotely adjustable extension mirror system.

Referring to FIG. 14, a exploded rear view, taken from the side of the transportation device looking forwards, of a multiple-pivot remotely-adjustable extension mirror system is shown at 150. The multiple-pivot remotely adjustable extension mirror system 150 includes the remotely adjustable side-view mirror unit 102 and a multiple-pivot detachable extension mirror unit shown at 106. The remotely adjustable side-view mirror unit 102 includes the actuator housing 26, the actuator attachment element 27, and an actuator pivot 82. The multiple-pivot detachable extension mirror unit 106 includes a non-obscuring extension reflective surface shown at 40, which is attached to an extension mirror housing shown at 33. The extension mirror housing 33 is attached to an arm shown at 32. The arm 32 is attached to a detachable vacuum attachment unit shown at 60. The detachable vacuum attachment unit 60 attaches to the first reflective surface 20.

Also referring to FIG. 14, a flexible spacing element is shown at 41. The flexible spacing element 41 is located between the arm 32 and the side-view mirror housing, shown at 21, when the multiple-pivot detachable extension mirror unit 203 is mounted on the remotely adjustable side-view mirror unit 102. The flexible spacing element 41 and side-view mirror housing 21 are shaped in such a way as to create an second pivot shown at 83, around which the non-obscuring extension reflective surface 40 will rotate when the multiple-pivot detachable extension mirror unit 106 is mounted on the remotely-adjustable side-view mirror unit 102. A second-pivot detachable attachment unit is shown at 34. In the embodiment shown here, the second-pivot detachable attachment unit 34 includes an attachment ring shown at 36 that attaches to the arm 32 in close proximity to the flexible spacing element, a hook shown at 38 that attaches to the side-view mirror housing 21, and a belt shown at 37 that connects the attachment ring 36 to the hook 38. Although only one configuration for the second-pivot detachable attachment unit 34 is illustrated here, it is possible to make other types of attachment units using other elements and to have this attach at different locations to the ones shown here.

Figure 15:
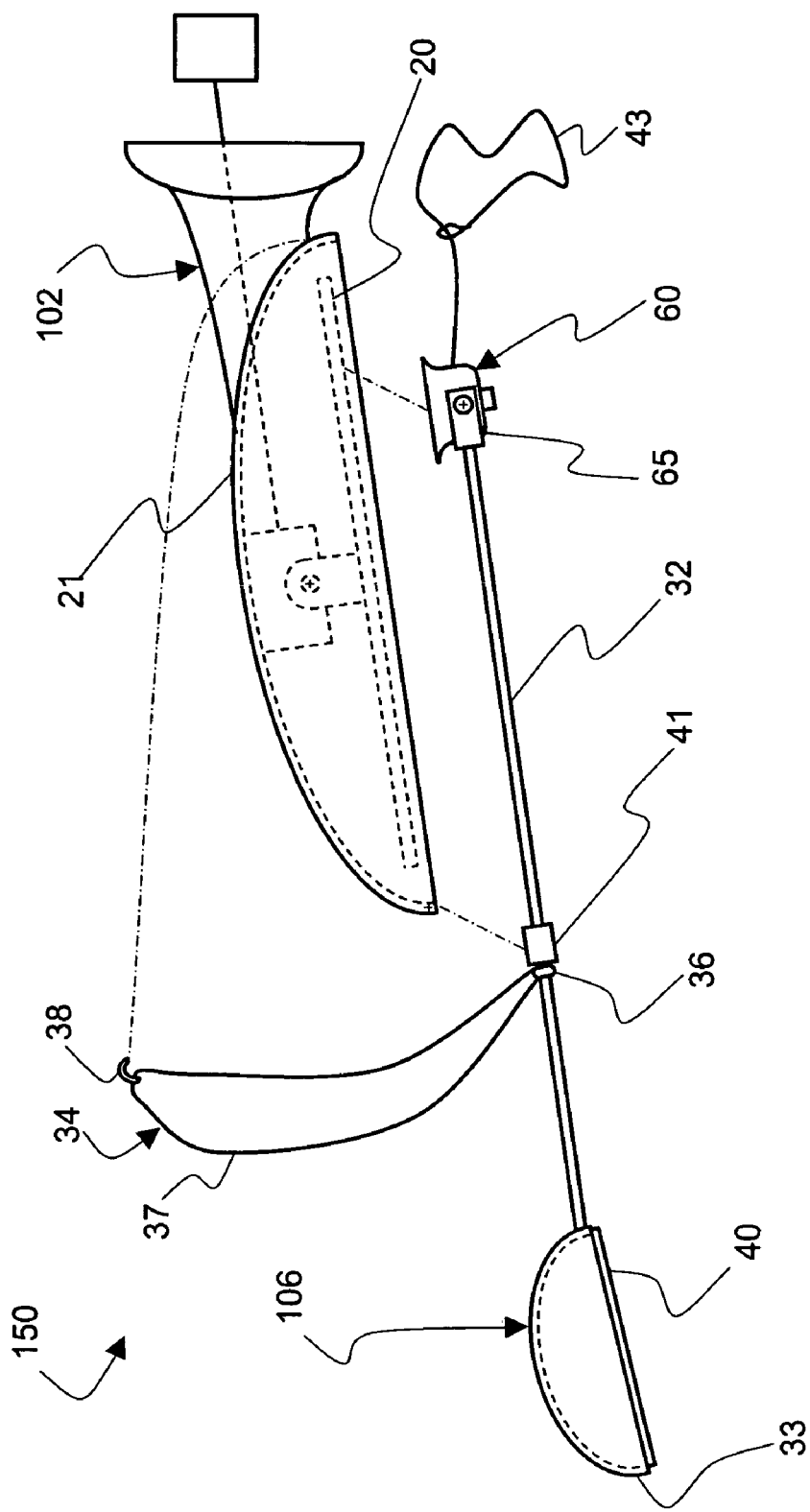
FIG. 15 is an exploded top view of the multiple-pivot remotely adjustable extension mirror system.
Figure 16:
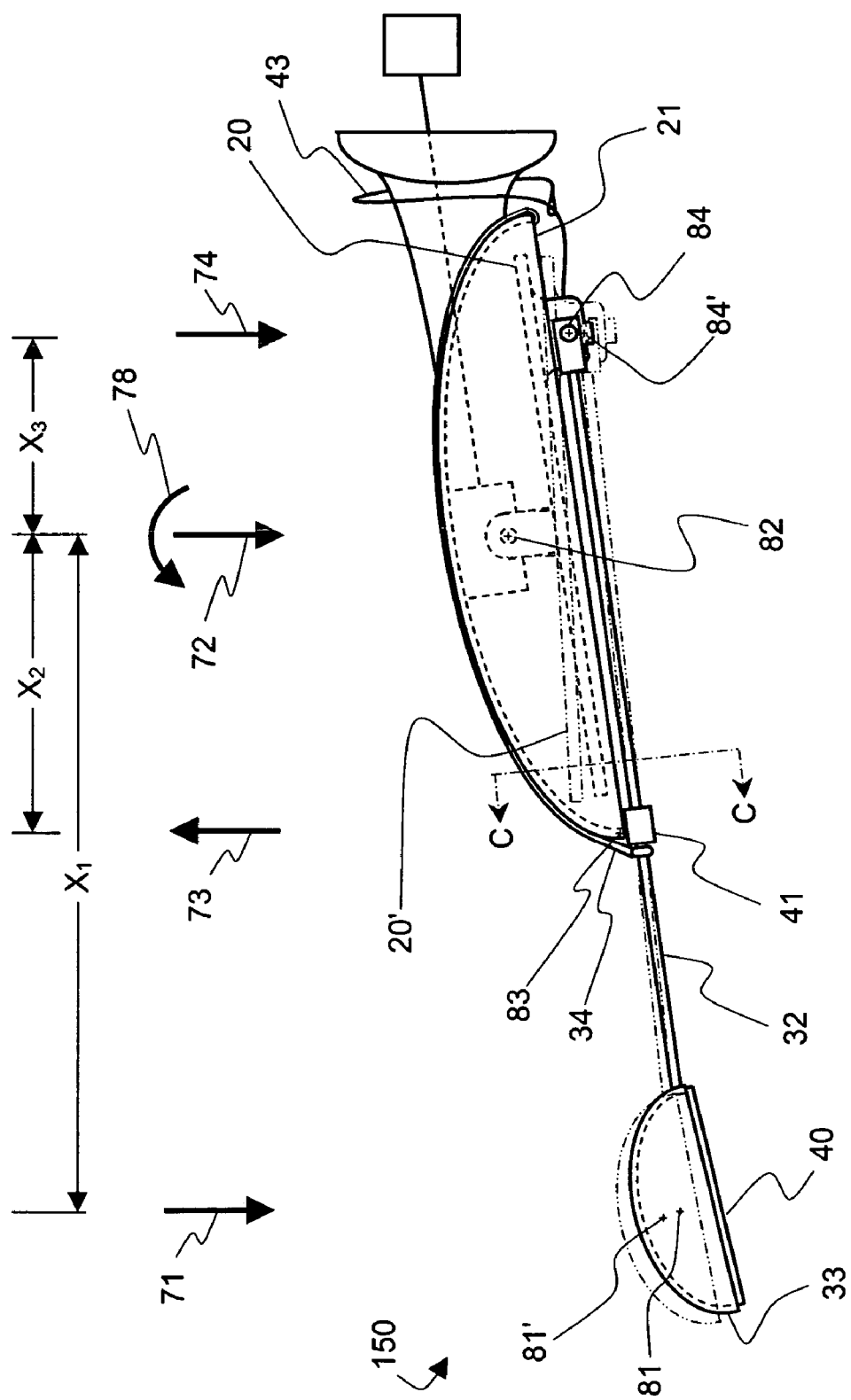
FIG. 16 is a top view of the multiple-pivot remotely adjustable extension mirror system showing movement of a multiple-pivot detachable extension mirror unit in response to rotation about the vertical axis of the original reflective surface and showing the impact of wind-induced forces.

Referring to FIG. 14, FIG. 15, and FIG. 16 a safety attachment element is shown at 43. In the configuration shown here, the safety attachment element is a cord that connects the multiple-pivot detachable extension mirror unit 106 to the side-view mirror unit, 102.

Referring to FIG. 15, a exploded top view of the multiple-pivot remotely-adjustable extension mirror system is shown at 150. The multiple-pivot remotely adjustable extension mirror system 150 includes the remotely adjustable side-view mirror unit 102 and the multiple-pivot detachable extension mirror unit 106. The multiple-pivot detachable extension mirror unit 106 includes the non-obscuring extension reflective surface 40, which is attached to the extension mirror housing 33. The extension mirror housing 33 is attached to the arm 32, which is attached to the detachable vacuum attachment unit 60, which attaches to the first reflective surface 20.

Also referring to FIG. 15, the flexible spacing element 41 is located between the arm 32 and the side-view mirror housing 21, when the multiple-pivot detachable extension mirror unit 106 is mounted on the remotely adjustable side-view mirror unit 102. The flexible spacing element 41 and side-view mirror housing 21 are shaped in such a way as to create a second pivot shown at 83, around which the non-obscuring extension reflective surface 40 will rotate when the multiple-pivot detachable extension mirror unit 106 is mounted on the remotely adjustable side-view mirror unit 102. The second-pivot detachable attachment unit is shown at 34. In the embodiment shown here, the second-pivot detachable attachment unit 34 includes the attachment ring 36 that attaches to the arm 32 in close proximity to the flexible spacing element 41, the hook 38 that attaches to the stationary housing 21, and the belt 37 that connects the attachment ring 36 to the hook 38. Although only one configuration for the second-pivot detachable attachment unit 34 is illustrated here, it is possible to make other types of attachment units using other elements and to have these attachment units attach at different locations than configuration shown here.

Referring to FIG. 16, a top view the multiple-pivot remotely adjustable extension mirror system is shown at 150. The multiple-pivot remotely adjustable extension mirror system 150 includes the multiple-pivot detachable extension mirror unit shown at 106. The multiple-pivot detachable extension mirror unit 106 includes the non-obscuring extension reflective surface 40, the extension mirror housing 33, the arm 32, and the flexible spacing element 41. The non-obscuring extension reflective surface 40 is attached to the extension mirror housing 33, which is attached to the arm 32. The flexible spacing element 41 is located between the arm 32 and the stationary housing, 21. The flexible spacing element 41 and stationary housing 21 create a second pivot shown at 83, around which the non-obscuring extension reflective surface 40 will move when the first reflective surface 20 rotates horizontally or vertically about the actuator pivot 82. The second-pivot detachable attachment unit is shown at 34 connects the arm 31 to the side-view mirror housing 21. In the embodiment shown here, the safety attachment element 43 is a cord that connects the multiple-pivot detachable extension mirror unit 106 to the remotely adjustable side-view mirror unit, 102.

Also referring to FIG. 16, the first reflective surface 20 is rotated vertically in the clockwise direction about the actuator pivot 82 to an alternate position shown at 20'. The clockwise pivoting motion 20' of the first reflective surface 20 causes an attachment unit pivot, shown at 84, to rotate clockwise about the vertical axis around the actuator pivot 82 to a new position, shown as 84'. The movement of the attachment unit pivot 84 to a new position 84' causes the arm 32 and the flexible spacing element 41, to rotate about the second pivot 83. The movement of the attachment unit pivot 84 to a new position 84' also causes the arm 32 to move a small distance in the axial direction. Because the angles of motion are small the flexible spacing element 41 can absorb these small axial movements, creating a four-bar linkage that is understood by anyone skilled in the art, wherein:

there is one link bar between the actuator pivot 82 and the attachment unit pivot 84;

there is one link bar between the attachment unit pivot 84 and the flexible spacing element 41;

there is one link bar between the flexible spacing element 41 and the second pivot 83; and there is one link bar between the second pivot 83 and the actuator pivot 82.

Further referring to FIG. 16, vertical rotation of the arm 32 about the second pivot 83 results in rotation of the extension mirror housing 33 and the non-obscuring extension reflective surface 40 about the second pivot 83 as illustrated by the displacement of the extension mirror housing center point, shown at 81 to a rotated position shown at 81'. Thus, the non-obscuring extension reflective surface 40 can be adjusted by movement of the first reflective surface 20 providing remote adjustability to the multiple-pivot extension mirror system 150.

Figure 17:
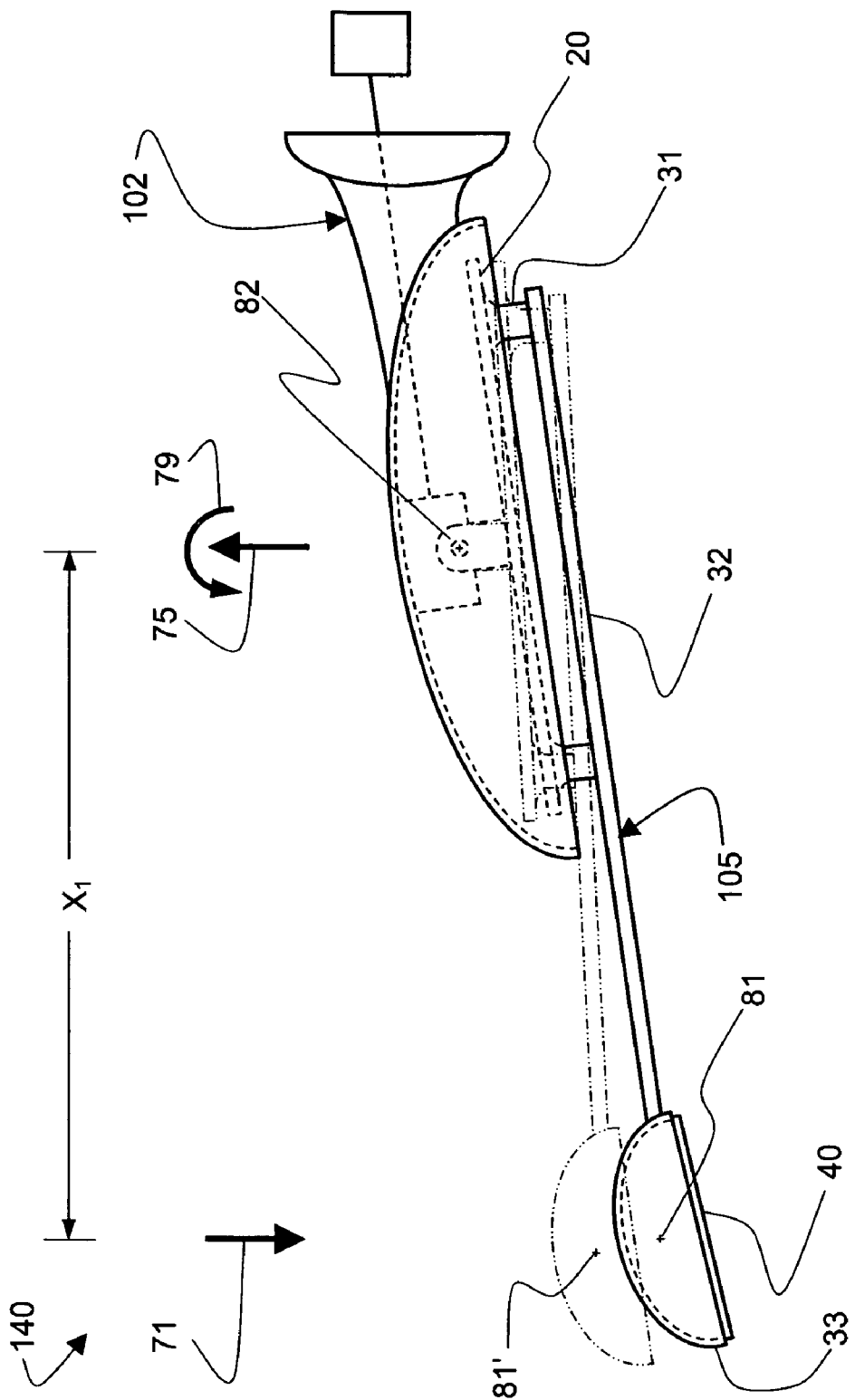
FIG. 17 is a top view of a single-pivot remotely adjustable extension mirror system showing movement of a single-pivot detachable extension mirror unit in response to rotation about the vertical axis of the original reflective surface and showing the impact of wind-induced forces.

Referring to FIG. 17 a top view of a single-pivot remotely adjustable extension mirror system is shown at 140. The single-pivot remotely adjustable extension mirror system 140 includes the remotely adjustable side-view mirror unit 102 and a single-pivot suction-cup detachable extension mirror unit shown at 105. The single-pivot suction-cup detachable mirror unit 105 uses vacuum suction cups shown at 31 to mount to the first reflective surface shown at 20 in the same way as the suction-cup detachable obscuring extension mirror unit, shown at 103 in FIG. 2, is mounted. The single-pivot suction-cup detachable mirror unit 140 also includes the arm 32, the extension mirror housing 33, and the non-obscuring extension reflective surface 40, which are part of the multiple pivot detachable extension mirror unit shown at 106 in FIG. 14, FIG. 15 and FIG. 16. Thus, the single-pivot remotely adjustable extension mirror system 140 is a hybrid of the suction-cup remotely-adjustable extension mirror system shown at 110 in FIG. 2 and the multiple-pivot remotely-adjustable extension mirror system 150 shown in FIG. 14, FIG. 15 and FIG. 16. In the suction-cup remotely adjustable extension mirror system, 110 in FIG. 2, and the single-pivot remotely adjustable extension mirror system 140, the extension reflective surface, shown as 30 in FIG. 6 and as 40 in FIG. 17 rotates about the actuator pivot, shown as 82 in FIG. 17. Movement of the first reflective surface 20 translates to movement of the extension mirror housing center point shown as 81 to a rotated position shown at 81'. Thus, the non-obscuring extension reflective surface 40 can be adjusted by movement of the first reflective surface 20 providing remote adjustability to the single-pivot remotely adjustable extension mirror system 140 shown here.

Referring to FIG. 16 and FIG. 17, an extension wind load is shown at 71. The extension wind load 71 is caused by air flow as the car moves in the forward direction. Although the extension wind load 71 is distributed over the entire surface of the extension mirror unit, it can be approximated as a single force vector at about the middle of the extension mirror housing 33.

Referring to FIG. 17, a single-pivot wind-induced actuator force 75 at the actuator pivot 82, can be calculated to be equal in magnitude and opposite in direction to the extension wind load 71 (i.e. $F_{75}=-F_{71}$). The single-pivot wind-induced actuator torque 79 can be calculated as $M_{79}=X_1 F_{71}$ where $X_1$ is the perpendicular distance between 81 and 82.

Referring to FIG. 16, the multiple-pivot wind-induced actuator force 72 and multiple-pivot wind-induced actuator torque 78 can be calculated using the following formulas:

$$F_{72}=F_{71}(X_1-X_2)/(X_2+X_3)$$

$$M_{78}=-F_{71}X_3(X_1-X_2)/(X_2+X_3)$$

The reduction in force and torque by converting from the single-pivot remotely adjustable extension mirror system 140 to the equivalently-sized multiple-pivot remotely-adjustable extension mirror system 150 can be calculated as:

$$F_{72}/F_{75}=-(X_1-X_2)/(X_2+X_3)$$

$$M_{78}/M_{79}=-(X_3/X_1)(X_1-X_2)/(X_2+X_3)$$

For a typical situation in which $X_1$ is 200 mm, $X_2$ is 100 mm and $X_3$ is 50 mm this results in the following:

$$F_{72}/F_{75}=-2/3$$

$$M_{78}/M_{79}=-1/6$$

This means that, by converting from the single-pivot remotely-adjustable extension mirror system 140 to the equivalently-sized multiple-pivot remotely-adjustable extension mirror system 150 we have changed a tensile force on the first reflective surface to a compressive force, which is much easier to provide and reduce the magnitude of this force to ⅔ of its original value and we have reduce the magnitude of the torque at the actuator pivot 82 by a factor of 6. This is especially a benefit in situations where the actuator 25 in FIG. 2, FIG. 4, and FIG. 5 is weak and the extension distance $X_1$ is large, which most commonly occurs when small cars pull large trailers.

Figure 18:
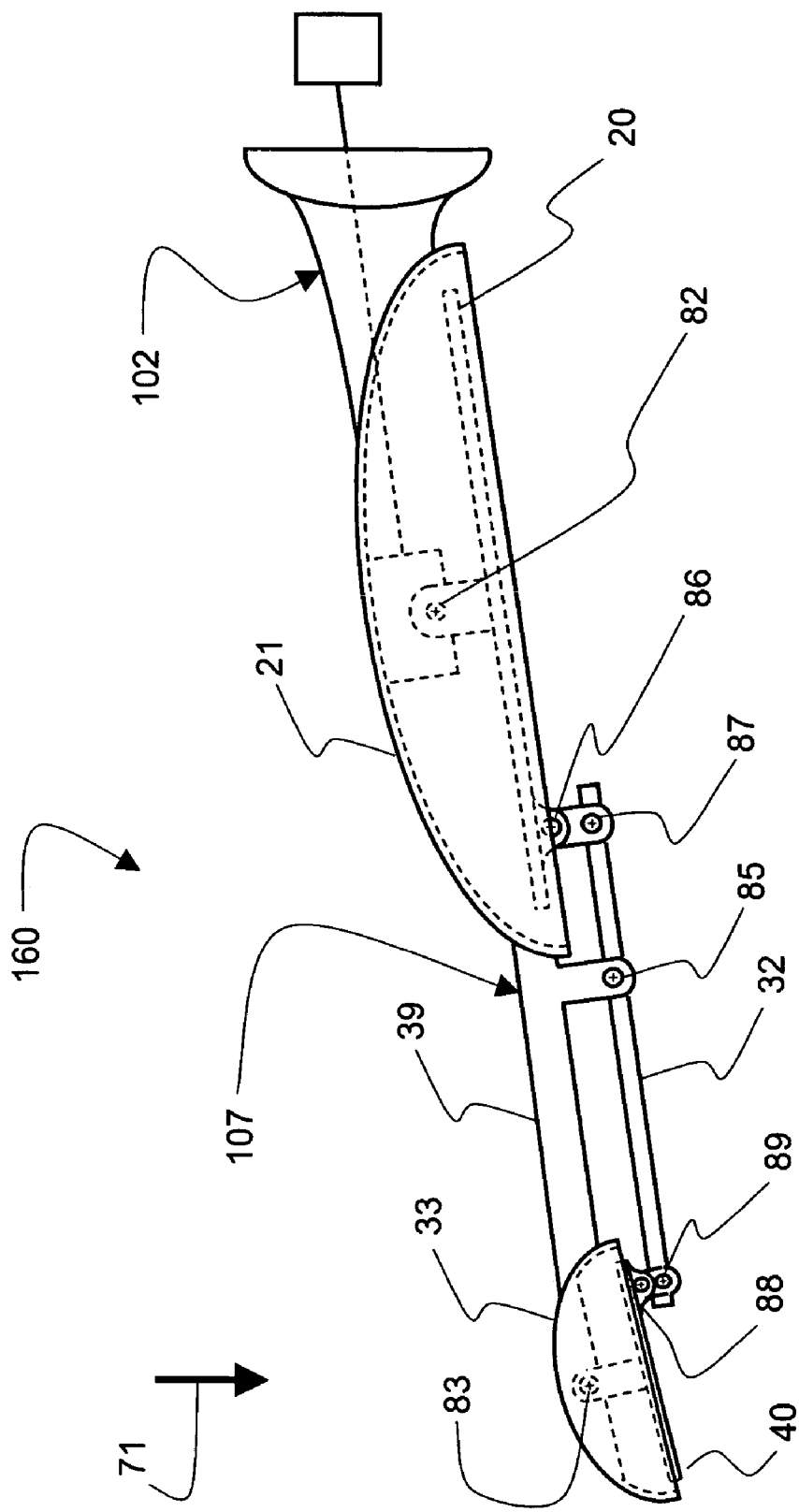
FIG. 18 is a top view of a zero mirror wind load remotely adjustable extension mirror system.

Referring to FIG. 18 a zero-mirror-wind-load remotely adjustable extension mirror system is shown at 160. This zero-mirror-wind load remotely adjustable extension mirror system includes the remotely adjustable side-view mirror unit 102 and a zero-mirror-wind-load multiple-pivot detachable extension mirror unit. The extension wind load 71 does not create any force on the first reflective surface 20 because the non-obscuring extension reflective surface 40 is shielded from the extension wind load 71 by the extension mirror housing 33 that is fixedly attached to the side-view mirror housing 21 using an extension wind load transfer element, shown at 39. In the system shown here, the first reflective surface 20 pivots about the actuator pivot 82 and the non-obscuring extension reflective surface 40 pivots about the second pivot 83. A third pivot, shown at 85, fourth pivot, shown at 86, fifth pivot, shown at 87, sixth pivot, shown at 88, and seventh pivot, shown at 89 are used to transfer movement of the first reflective surface 20 to the non-obscuring extension reflective surface 40 as one example of the zero-mirror-wind-load remotely-adjustable extension mirror system 160 can be implemented. It can also be implemented using other methods of mechanically, electrically, hydraulically, or pneumatically transferring motion of the first reflective surface 20 to the non-obscuring extension mirror surface 40. It can also be implemented using a fully obscuring extension reflective surface, 30 in FIG. 2, or a partially obscuring extension reflective surface.

Figure 10:
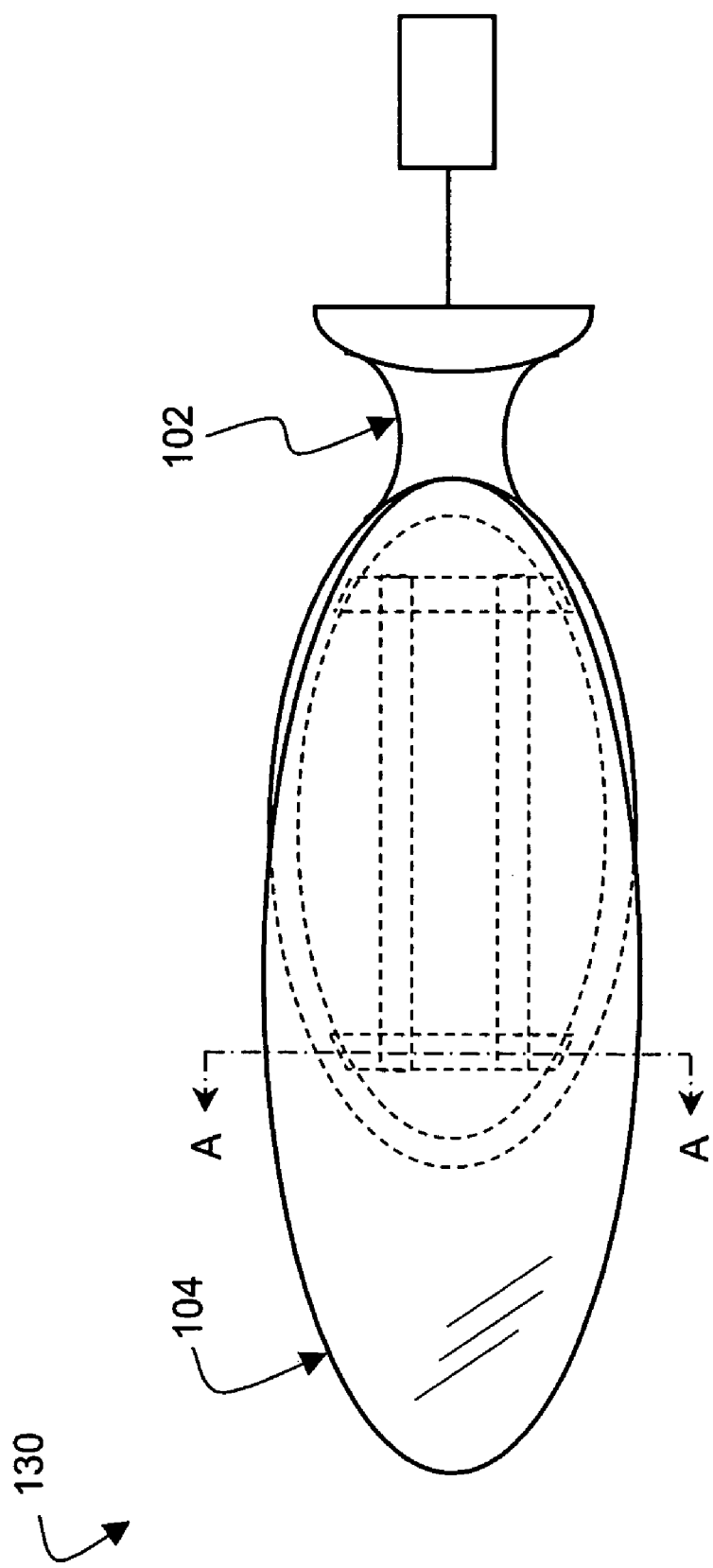
FIG. 10 is a rear view of the mirror-gap-element remotely adjustable extension mirror system.

Referring to FIG. 2, FIG. 3, FIG. 4, FIG. 7, FIG. 8, FIG. 9, FIG. 10, FIG. 14, FIG. 15, FIG. 17 and FIG. 18, the detachable extension mirror, shown as 103 in FIG. 2, FIG. 2, FIG. 3, FIG. 7, and FIG. 8, shown as 104 in FIG. 9 and FIG. 10, shown as 106 in FIG. 14 and FIG. 15, shown as 105 in FIG. 17, and shown as 107 in FIG. 18 can be as light as possible in one embodiment. A low mass detachable extension mirror will have a lower load on the target surface when the vehicle is being driven or when a car door is slammed shut. The total weight of the detachable extension mirror can be less than 6 oz; the total weight can be less than 7 oz; the total weight can be less than 8 oz; the total weight can be less than 9 oz; the total weight can be less than 10 oz; the total weight can be less than 11 oz; the total weight can be less than 12 oz. It is important to reduce the total mass of the outboard extension mirror elements, namely the arm 20 and all elements in the extension mirror that are further outboard from the transportation device, including the extension mirror housing 33, and the extension surface 40. The total weight of the outboard extension mirror elements can be less than 4.5 oz; the total weight can be less than 5 oz; the total weight can be less than 6 oz; the total weight can be less than 7 oz; the total weight can be less than 8 oz; the total weight can be less than 9 oz; the total weight can be less than 10 oz.

Figure 19:
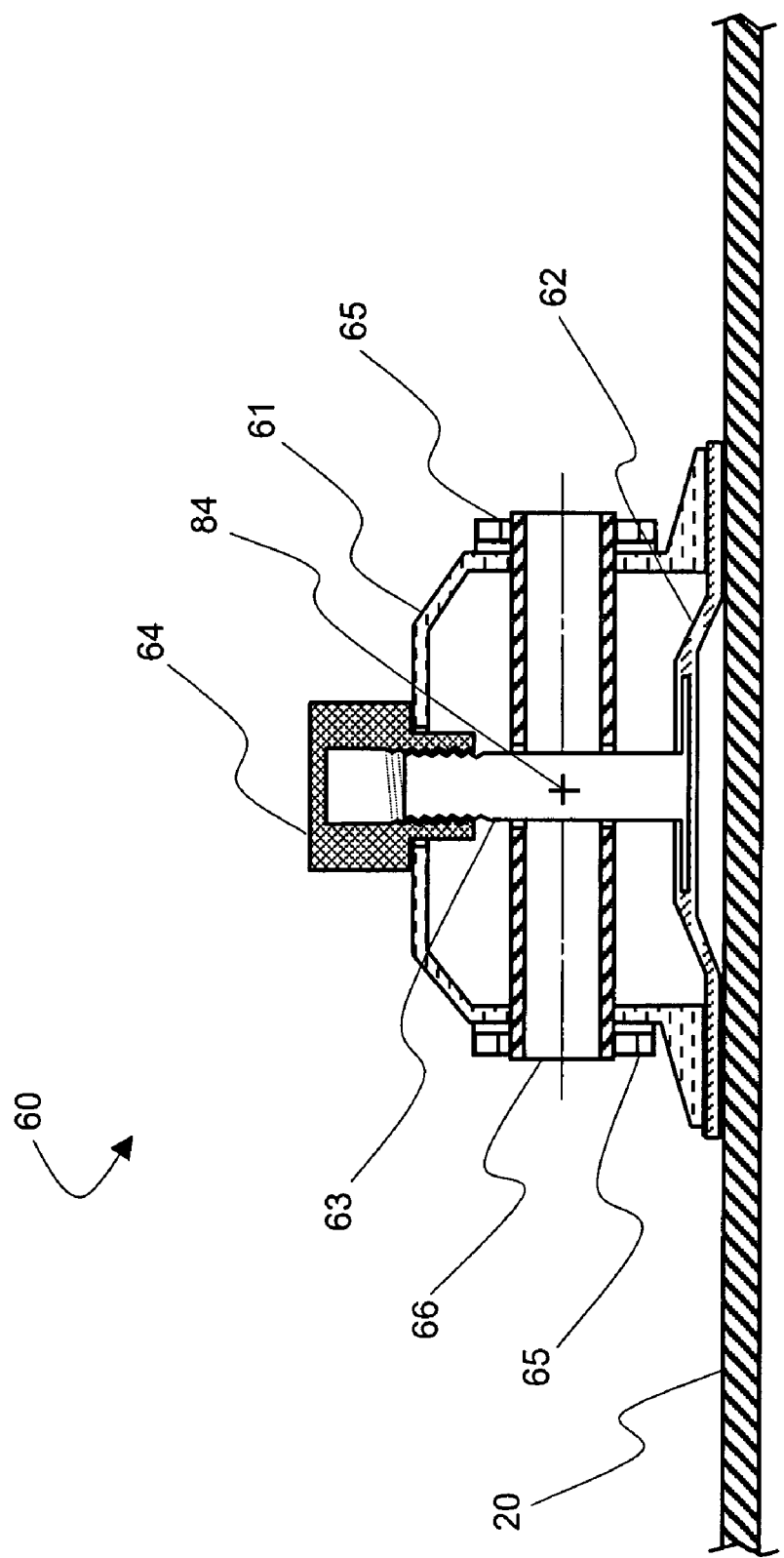
FIG. 19 is a section view of the mirror attachment unit through section B—B in FIG. 14 showing a vacuum diaphragm in an attached state.
Figure 20:
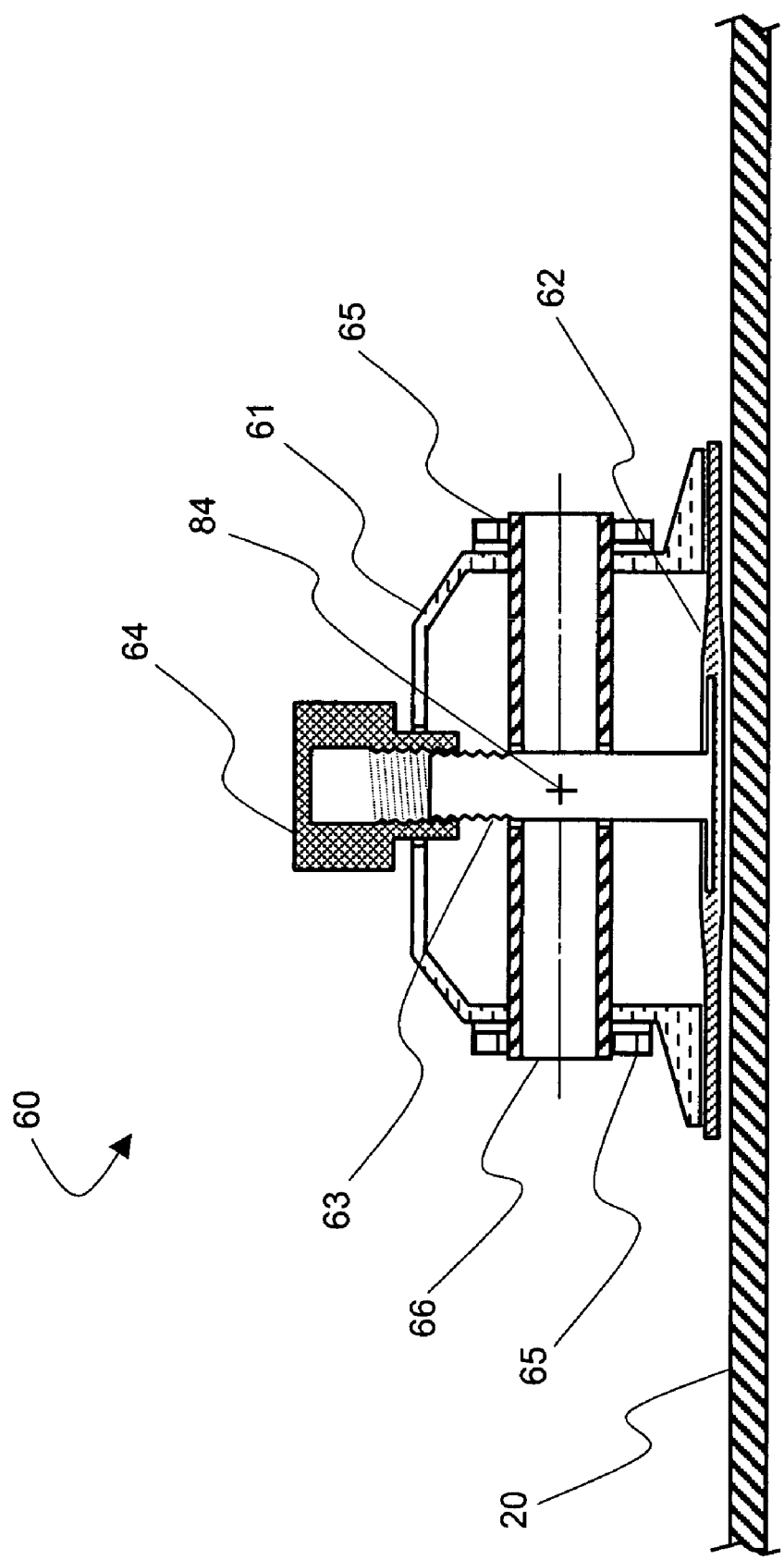
FIG. 20 is a section view of the mirror attachment unit through section B—B in FIG. 14 showing the vacuum diaphragm in a loose state.

Referring to FIG. 19 and FIG. 20 a detachable vacuum attachment unit is shown at 60. In FIG. 19, the detachable vacuum attachment unit 60 is shown attached to the first reflective surface 20, also known as a target surface. In FIG. 20, the detachable vacuum attachment unit 60 is shown loose from the target surface 20. The detachable vacuum attachment unit 60 is designed to provide a secure method of attachment to the target surface 20. The detachable vacuum attachment unit 60 includes:

an attachment unit housing, shown at 61;
a vacuum diaphragm, shown at 62;
a diaphragm tensioning element, shown at 63;
a tensioning nut, shown at 64;
a connecting yoke, shown at 65; and
a connecting pin, shown at 66.

In the embodiment shown, the vacuum diaphragm 62 is made of poly-vinyl-chloride (PVC) and is in the form of a disk. The side of the vacuum diaphragm 62 facing the target surface 20 is called the attachment surface. In one embodiment, at least part of the central area of the attachment surface of the vacuum diaphragm 62 protrudes further than the circumferential area of the attachment surface when the vacuum diaphragm 62 is in its relaxed state to facilitate release of the vacuum diaphragm 62 from the attachment surface 20. Other release elements that can be used to facilitate release are discussed in reference to FIG. 26 and FIG. 27.

The embodiment of the vacuum diaphragm 62 shown in FIG. 19 and FIG. 20 does not have the same shape or operating characteristics as the vacuum suction cups, shown as 31 in FIG. 2, FIG. 4, FIG. 5, FIG. 6, and FIG. 7. The embodiment of the vacuum suction cups 31 shown in FIG. 2, FIG. 4, FIG. 5, FIG. 6, and FIG. 7 have a central area of the attachment surface that is recessed from the edges of the attachment surface relative to the circumferential area, or lip, of the attachment surface when the suction cups 31 are in their relaxed state. Thus, the suction cups 31 shown in FIG. 2, FIG. 4, FIG. 5, FIG. 6, and FIG. 7 can be made to adhere to the target surface 20 by pressing them against the target surface 20 and will continue to adhere to the target surface until the vacuum is broken by prying the edges of the suction cups 31 off of the target surface 20. In comparison, the vacuum diaphragm 62 can only be made to adhere to the target surface 20 if the circumferential area or lip of the vacuum diaphragm 62 is pressed against the target surface 20 by a constraining element, such as the attachment unit housing 61, and the central area of the attachment surface of the vacuum diaphragm 62 is pulled away from the target surface 20 creating a vacuum or localized low pressure area. The benefit of the vacuum diaphragm 62 and the configuration shown in FIG. 18 and FIG. 19 is that when the vacuum diaphragm 62 is brought back to its relaxed state as shown in FIG. 19, the vacuum diaphragm 62 will release from the target surface 20 without having to be pried off. By the term vacuum, used to describe the behavior of either of the vacuum suction cups 31 or the detachable vacuum attachment unit 60, it should be understood that vacuum means a localized area of low pressure that creates an attachment force between a target surface 20 and a suction cup, where the suction cup can be either in the form shown as 31 in FIG. 2, FIG. 4, FIG. 5, FIG. 6, and FIG. 7 or in the form of the detachable vacuum attachment unit 60, shown in FIG. 19 and FIG. 20. Thus, the terms "suction cup" and "vacuum diaphragm" should be understood to be interchangeable. A suction cup does not necessarily need to be unconstrained and a vacuum diaphragm does not necessary need to be constrained by a housing or other element.

It should also be understood that the engagement surface of the suction cup or vacuum diaphragm 62 does not need to be circular. It can be of any shape arbitrary shape, including elliptical, that will provide a vacuum-induced retention force between the suction cup or vacuum diaphragm and the target surface.

The retaining force between the suction cup or vacuum diaphragm 62 and the target surface 20 is determined by the size of the suction cup. One way to specify the size of the suction cup or vacuum diaphragm is by the area or portion enclosed by its lip. The suction cup area can be less than 12 square inches; the suction cup area can be less than 10 square inches; the suction cup area can be less than 10 square inches; the suction cup area can be less than 8 square inches; the suction cup area can be less than 6 square inches; the suction cup area can be less than 4 square inches; the suction cup area can be less than 3 square inches. The suction cup area can be greater than 12 square inches; the suction cup area can be greater than 10 square inches; the suction cup area can be greater than 8 square inches; the suction cup area can be greater than 6 square inches; the suction cup area can be greater than 3 square inches.

FIG. 19 and FIG. 20 further illustrate how the vacuum diaphragm 62 functions as part of the detachable vacuum attachment unit 60. A diaphragm-tensioning element 63 is attached to the vacuum diaphragm 62 to pull the central area of the vacuum diaphragm 62 away from the target surface 20. In the configuration shown here, the tensioning element 63 is made of molded polypropylene and is insert molded into the vacuum diaphragm 62. In the configuration shown here, the tensioning element 63 has threads molded into the end opposite the vacuum diaphragm 62 and these threads can engage with the threads in the tensioning nut 64. Tensioning can be accomplished through a rotating adjustment that operates in a plane substantially parallel to the target surface. Tensioning can be accomplished using other types of adjustment that are known or can be conceived by anyone skilled in the art. The attachment unit housing 61 acts as a constraining element. The attachment unit housing 61 has a lip that presses against the circumference of the vacuum diaphragm 62 when the attachment unit housing 61 is pressed against the target surface 20. The attachment unit housing 61 also provides a surface for the tensioning nut 64 to rest against when the tensioning nut 64 has been tightened as shown in FIG. 19.

FIG. 19 and FIG. 20 also illustrate how the detachable vacuum attachment unit 60 can provides an attachment unit pivot, shown at 84. When the original reflective surface 20 rotates about the vertical axis, the attachment unit will translate and rotate about the centerline of the connecting pin 66 that is mounted in the attachment unit housing 61. The connecting pin 66 also goes through the yoke 65 allowing the yoke 65 to rotate about the vertical axis around the attachment unit pivot 84. In one embodiment, the yoke 65 attaches to the arm shown as 32 in FIG. 14, FIG. 15, FIG. 16, FIG. 17, and FIG. 18. Other views of the yoke 65 are shown in FIG. 14 and FIG. 15.

Figure 24:
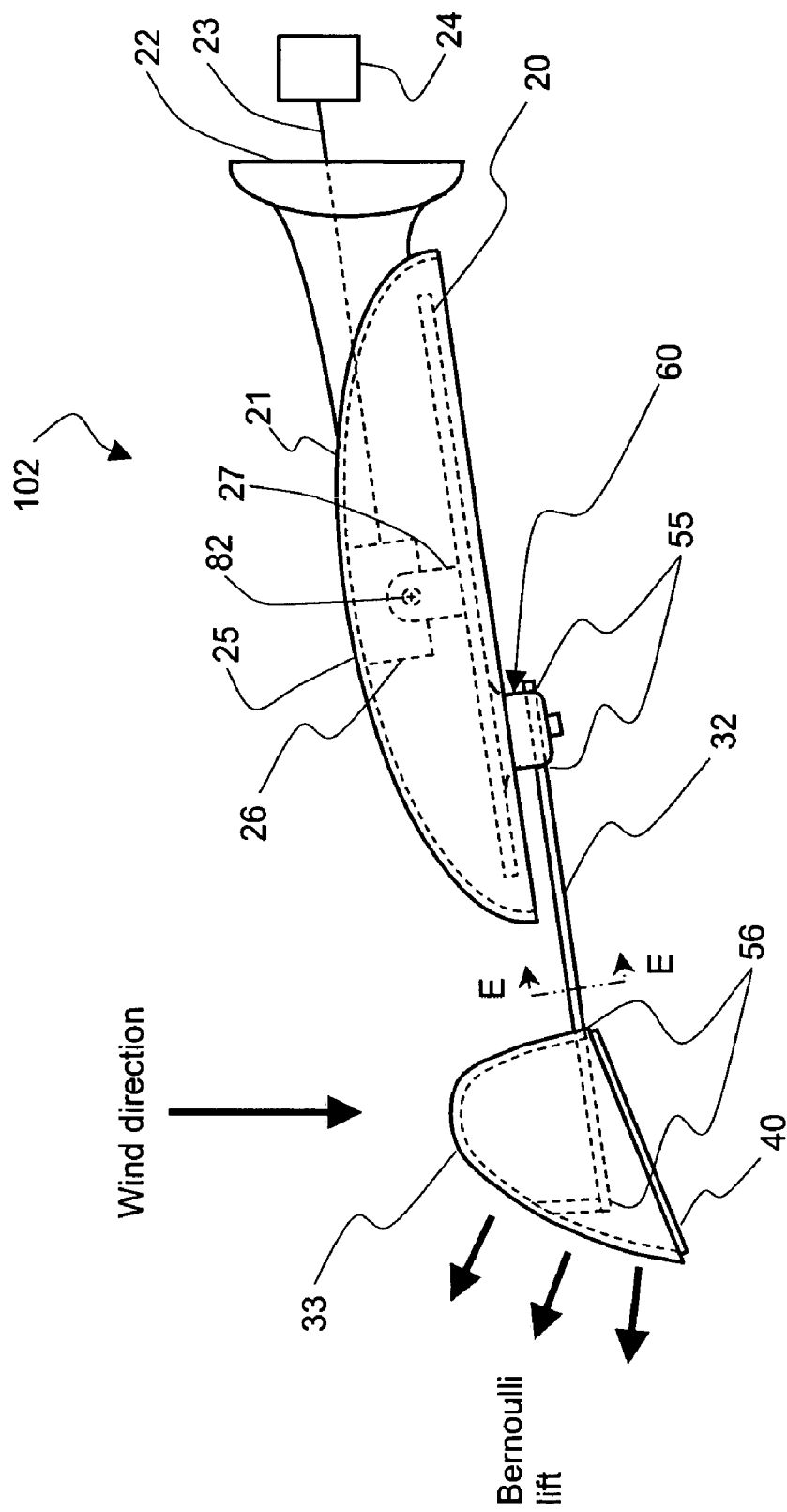
FIG. 24 is a top view showing a lift-generating extension mirror housing.

Referring to FIG. 19, FIG. 20, and FIG. 24, it is also possible to connect the arm, shown at 32 in FIG. 24 directly to the housing, shown at 61 in FIG. 19 and FIG. 20 in place of the connecting pin shown at 66 in FIG. 19 and FIG. 20. In this case, a rigid two-point connection is made between the arm 32 and the housing 61, and no yoke 65 is used.

Figure 21:
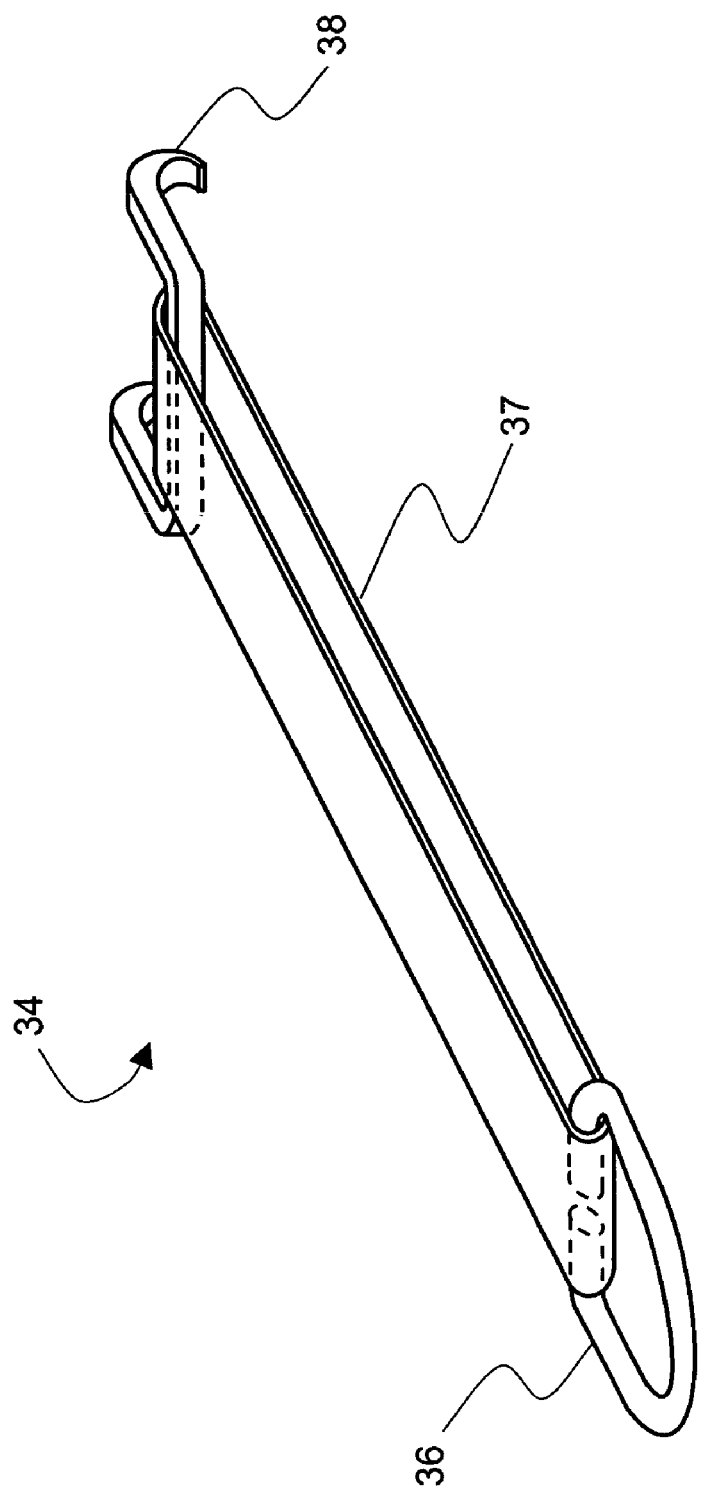
FIG. 21 is a perspective view of a second-pivot detachable attachment unit.

Referring to FIG. 21 the second-pivot detachable attachment unit 34 includes the attachment ring 36, the belt 37, and the hook 38. The attachment ring 36 can be made of metal that has been bent in a D-shape. The attachment ring 36 can also be made of other materials and in other configurations. The attachment ring 36 is placed over the arm, shown as 32 in FIG. 14, FIG. 15, FIG. 16, FIG. 17, and FIG. 18. In the embodiment shown here, the hook 38 is made of metal that has been bent to be able to clip onto the side-view mirror housing shown as 21 in FIG. 2, FIG. 4, FIG. 5, FIG. 6, FIG. 11, FIG. 13, FIG. 14, and FIG. 18. The hook 38 can also be made of other materials and in other configurations. In the embodiment shown here, the belt 37 is an elastic band made of a rubber compound with low sensitivity to ultraviolet light. Although a specific configuration of a specific set of elements is illustrated here, the second-pivot detachable attachment unit 34 can be of any combination of elements as long as they provide an attachment between a multiple pivot detachable extension mirror unit shown as 106 in FIG. 14 and FIG. 15 and an side-view mirror unit shown as 102 in FIG. 1, FIG. 2, FIG. 3, FIG. 4, FIG. 7, FIG. 8, FIG. 9, FIG. 10, FIG. 12, FIG. 13, FIG. 14, and FIG. 15.

Figure 22:
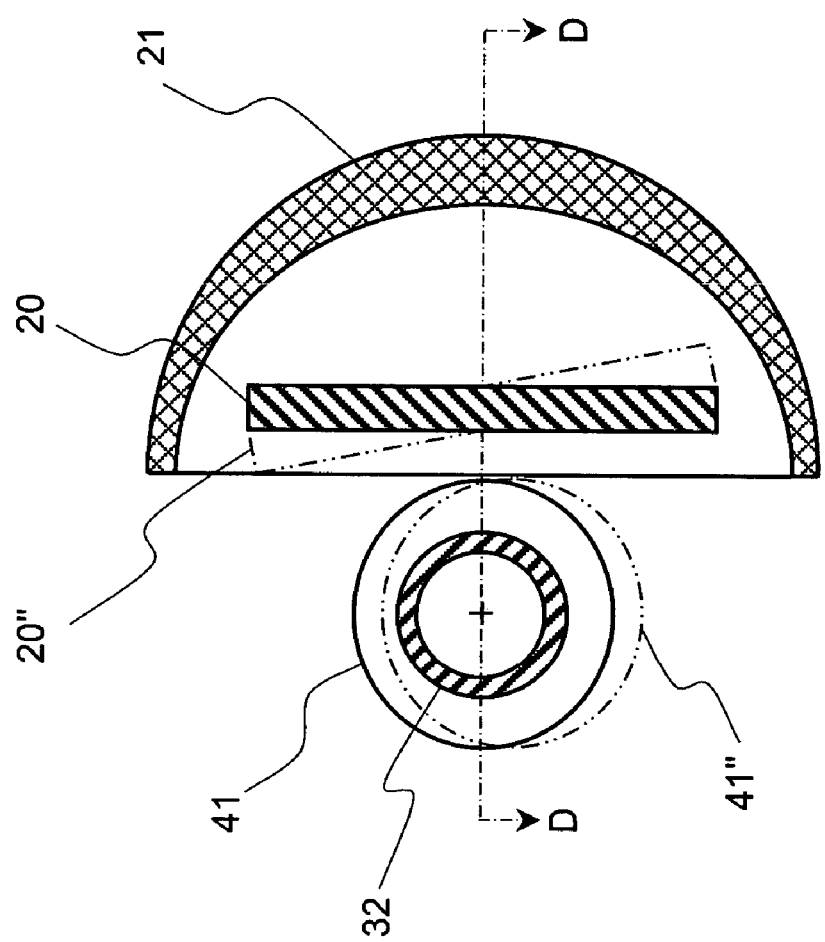
FIG. 22 is a horizontal view of section C—C in FIG. 16 showing details of how the flexible spacing element functions.

The view shown in FIG. 22 was created by taking section C—C from FIG. 16. Referring to FIG. 22 an end view of the flexible spacing element is shown at 41. In the embodiment shown here, the flexible spacing element 41 is a hollow poly-vinyl-chloride (PVC) cylinder that can be pressed onto the arm 32. In the embodiment shown here, the arm 32 is a hollow cylindrical aluminum tube. The flexible spacing element 41 rests against the side-view mirror housing 21. FIG. 22 also shows a section view of the target surface at 20. When the target surface 20 is pivoted counterclockwise in the horizontal axis about the actuator pivot, shown as 82 in FIG. 13, to an alternate position shown as 20″, this results in a counterclockwise rotation of the mirror link element 32 and the flexible spacing element 41 causing the flexible spacing element 41 to roll a small vertical distance along the edge of the side-view mirror housing 21 to a new position shown as 41″. Thus, the flexible spacing element 41 can continue to be connected to the edge of the side-view mirror housing 21 when a rotation of the target surface 20 is translated to horizontal rotation of the arm 32 and ultimately to horizontal rotation of the non-obscuring extension reflective surface shown as 40 in FIG. 14, FIG. 15, and FIG. 16.

Figure 23:
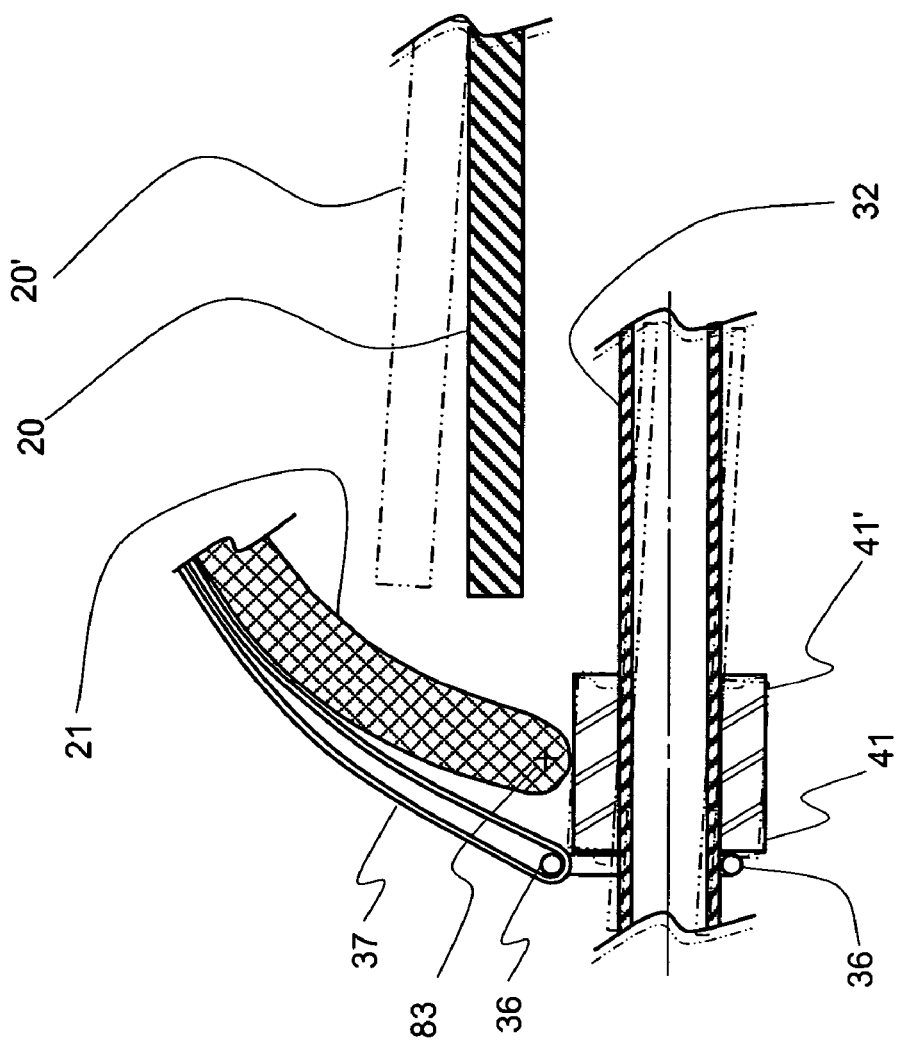
FIG. 23 is a top view of section D—D in FIG. 20 showing details of the flexible spacing element and extension reflective surface pivot attachment unit.

The view shown in FIG. 23 was created by taking section D—D from FIG. 22. Referring to FIG. 23 a section view of the flexible spacing element is shown at 41. In the embodiment shown here, the flexible spacing element 41 is a hollow poly-vinyl-chloride (PVC) cylinder that can be pressed onto the arm, shown in section view at 32. In one embodiment, the arm 32 is a hollow cylindrical aluminum tube. The flexible spacing element 41 rests against the side-view mirror housing 21. When the target surface, shown in section view as 20, is pivoted clockwise in the vertical axis about the actuator pivot, shown at 82 in FIG. 16, to an alternate position shown at 20′, this results in a displacement of the attachment unit pivot, shown at 84 in FIG. 16, to a new position, shown at 84′ in FIG. 16. The movement of the attachment unit pivot 84 to position 84′ causes the arm 32 and the flexible spacing element 41 to rotate in the vertical axis about the second pivot 83. The movement of the actuator pivot point 84 to a new position 84′ also causes the arm 32 to move a small distance in the axial direction. Because the angles of motion are small the flexible spacing element 41 can absorb these small axial movements as shown by the new position 41′ of the flexible spacing element 41.

Further referring to FIG. 23 a ring shown at 36 pulls the arm 32 towards the side-view mirror housing 21 to ensure that the flexible spacing element 41 is always resting against the side-view mirror housing 21. The ring 36 is held taught by the belt 37. In the embodiment disclosed here, the belt 37 is made of elastic material, which helps keep the flexible spacing element 41 pressed against the side-view mirror housing 21 even when the flexible spacing element 41 rotates about the horizontal axis and therefore rolls along the edge of the side-view mirror housing 21. More details of the configuration of the ring 36 and belt 37 are provided by FIG. 14, FIG. 15 and FIG. 21. It should be noted that the ring 36 does not connect the multiple-pivot detachable extension mirror unit 106 in FIG. 14 and FIG. 15 to the remotely adjustable side-view mirror unit 102 in FIG. 14 and FIG. 15 at exactly at the second pivot 83. However the attachment is sufficiently close that the second-pivot detachable attachment unit 34 can be considered to operate at the second pivot for purposes of calculating the force equations that were described in reference to FIG. 16.

Referring to FIG. 24, the remotely adjustable side view mirror unit is shown at 102. The remotely adjustable side-view mirror unit 102 is the same as previously described in reference to FIG. 13. FIG. 24 includes an extension mirror housing, shown at 33. This extension mirror housing 33 has a curvature on its outer surface that generates lift due to Bernoulli's principle, which states that: "an increase in the velocity of any fluid is always accompanied by a decrease in pressure. Air is a fluid. If you can cause the air to move rapidly on one side of a surface, the pressure on that side of the surface is less than that on the other side." By making the profiled shape of the extension mirror housing similar to that of an airplane wing, Bernoulli lift is generated on the exterior surface and this lift reduces the rotational moment caused by incident air about the actuator pivot, shown at 82.

FIG. 24 shows the use of multiple attachment points, shown at 55, connecting the arm, shown at 32, and the detachable vacuum attachment unit, shown at 60. FIG. 24 also shows the use of another set of multiple attachment points, shown at 56, connecting the arm 32 and the extension mirror housing 33. The use of multiple attachment points, 55 and 56, ensures that vibration of the extension mirror housing 33 and extension reflective surface, shown at 40, are minimized when the transportation device is driven or when the door of the transportation device is slammed shut.

FIG. 24 also shows that the vacuum attachment unit 60 and extension mirror housing 33 are separated by a distance. By making this distance as great as possible, the detachable extension mirror can provide the clearest view around an obstacle. The minimum distance between the attachment unit 60 and extension mirror housing 33 can be greater than 2 inches, greater than 3 inches, greater than 4 inches, greater than 5 inches, greater than 6 inches, greater than 7 inches, greater than 8 inches, or greater than 10 inches.

Referring to FIG. 14, FIG. 15, FIG. 16, FIG. 17, FIG. 18, and FIG. 24, the arm 32 runs approximately parallel to a plane defined by the target surface 20. The angle of the arm relative to the first plane can be less than 5 degrees; it can be less than 10 degrees; it can be less than 15 degrees; it can be less than 35 degrees; it can be less than 45 degrees.

Figure 25:
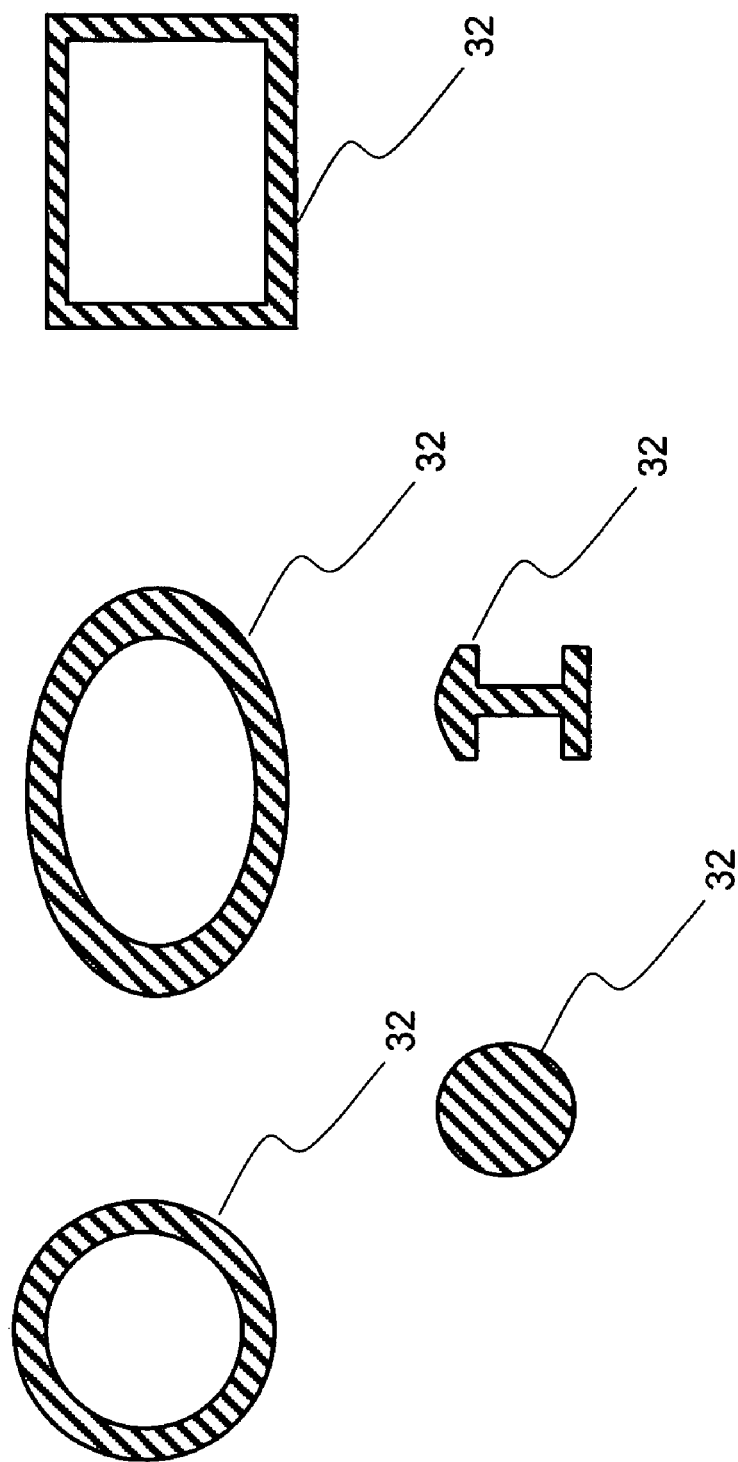
FIG. 25 is a view of section E—E in FIG. 24 showing examples of arm cross sections.

The view shown in FIG. 25 was created by taking section E—E from FIG. 24. Referring to FIG. 25, examples of arm cross sections are shown at 32. The arm cross section can be any of these configurations or any others that can be developed by anyone skilled in the art. The arm cross-section examples shown here were chosen because they provide high stiffness and low wind resistance when used as part of an extension mirror system. There is an important tradeoff to be made to minimize the mass and the wind resistance for the arm 32 while providing as stiff of an arm as possible. In one embodiment, the arm is made out of an aluminum tube with a ½ inch diameter and circular, but other embodiments could be elliptical, square, rectangular, or any other shape. This gives a circumference understood to mean the same as girth or cross-sectional perimeter) of 1.57 inches in one embodiment. Circumference is understood to mean the same as girth and is defined to be the length of the shortest piece of infinitely-thin string that can go completely around the object being measured. The circumference can be less than 1.0 inch; circumference can be less than 1.5 inches; circumference can be less than 1.6 inches; circumference can be less than 2 inches; circumference can be less than 3 inches; circumference can be less than 4 inches.

Another way of ensuring that the arm is as small as possible relative to the other parts of the extension mirror system is to define the girth or circumference of the arm 32 relative to the girth or circumference of the combined extension mirror housing 33 and extension surface 40 when measured in a plane parallel to the plane shown as section E—E in FIG. 24. The circumference of the arm can be less than 10%, 20%, 30%, 40%, 50%, 60%, 70%, 80%, 90% of the circumference of the combined extension mirror housing 33 and extension surface 40. The circumference of the arm can be greater than 10%, 20%, 30%, 40%, 50%, 60%, 70%, 80%, 90% of the circumference of the combined extension mirror housing 33 and extension surface 40.

Figure 26:
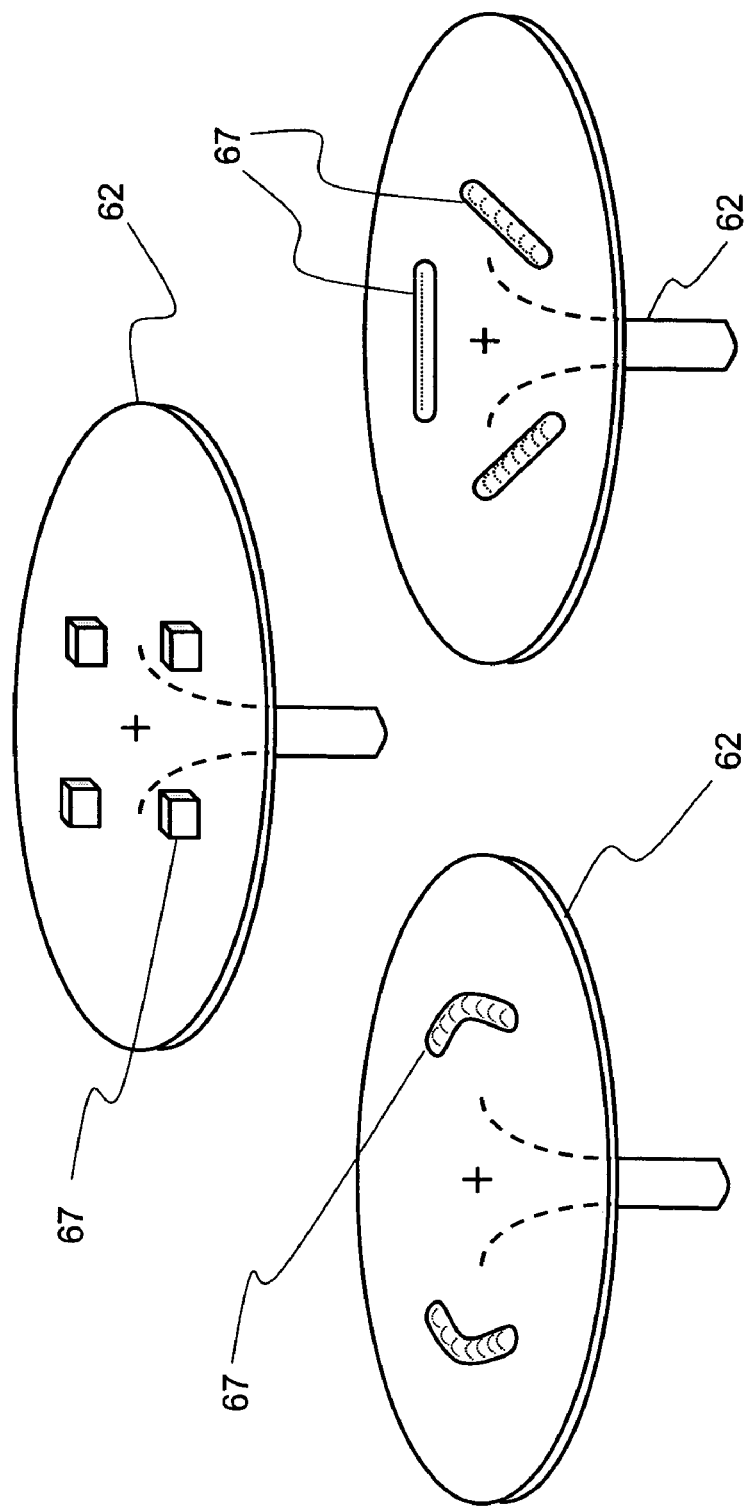
FIG. 26 shows examples of release elements on vacuum diaphragms or suction cups.

Referring to FIG. 26, examples of vacuum suction cups or vacuum diaphragms are shown at 62. These vacuum diaphragms are oriented so that their attachment surface is pointing upwards. These vacuum diaphragms include examples of release elements, shown at 67. Release elements 67, of the type shown in FIG. 26 will allow a user to cause the vacuum diaphragm to release from a mounting surface when the center of the vacuum diaphragm is pressed toward the mounting surface, an action that can be accomplished by pushing the stem of the vacuum diaphragm toward the mounting surface.

Figure 27:
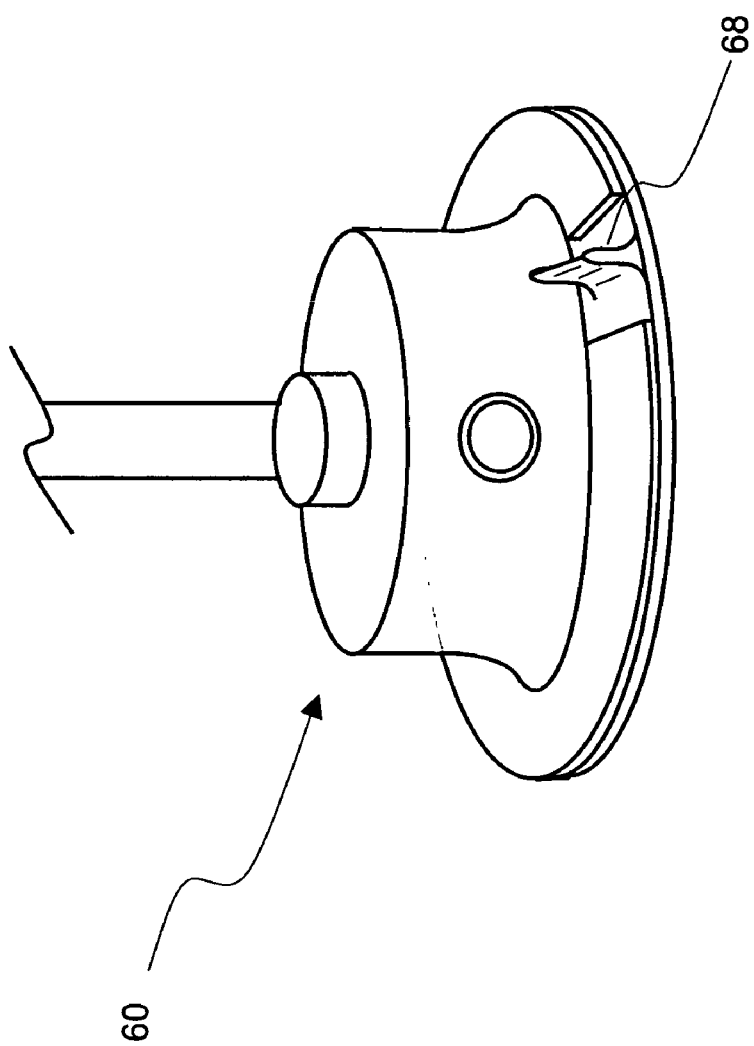
FIG. 27 is a perspective view of an alternate vacuum diaphragm release features.

Referring to FIG. 27, an alternate vacuum diaphragm release element is shown at 68. This alternate release element 68 is incorporated as part of the detachable vacuum attachment unit, shown at 60. By pulling the alternate release element 68 upwards, the vacuum holding the attachment unit 60 to a mounting surface is broken and the attachment unit 60 will come free from the mounting surface. FIG. 26 and FIG. 27 depict several examples of release elements that do not require a user to place something between the suction cup or vacuum diaphragm 62 and the mounting surface. Other types of release elements that can be developed by anyone skilled in the art can be used in the present invention as an alternative to the ones depicted in FIG. 26 and FIG. 27.

While the principles of the disclosure have been described above in connection with specific apparatuses and methods, it is to be clearly understood that this description is made only by way of example and not as limitation on the scope of the invention.

What is claimed is:

1. A detachable extension mirror for mounting on a side-view mirror of a transportation device, the detachable extension mirror comprising:
    a reflective surface;
    a suction cup configured to engage the side-view mirror of the transportation device, wherein:
        a target surface of the side-view mirror defines a first plane,
        a portion of the suction cup engages the target surface when properly installed, and
        a lip is defined by the distal edge or edges of the portion;
    a constraining element that engages a back-side of the portion at a point proximate to the lip to force at least part of the lip toward the target surface; and
    an arm that couples the suction cup to the reflective surface, wherein:
        the arm extends away from a second plane,
        the second plane is defined by a strait-forward direction of the transportation device,
        the second plane is also defined by being perpendicular to the ground, and
        the arm extends away from the suction cup at an angle of less than forty-five degrees with respect to either side of the first plane.

2. The detachable extension mirror for mounting on the side-view mirror of the transportation device of claim 1, wherein the angle is chosen from the group consisting of less than 35 degrees, less than 25 degrees, less than 15 degrees, less than 10 degrees, and less than 5 degrees.

3. The detachable extension mirror for mounting on the side-view mirror of the transportation device of claim 1, wherein:
    a mirror housing comprises the reflective surface, and
    the mirror housing and arm have a combined weight chosen from the group consisting of less than 10 ounces, less than 9 ounces, less than 8 ounces, less than 7 ounces, less than 6 ounces, less than 5 ounces, and less than 4.5 ounces.

4. The detachable extension mirror for mounting on the side-view mirror of the transportation device of claim 1, wherein a minimum circumference of the arm is selected from the group consisting of less than 5 inches, less than 4 inches, less than 3 inches, less than 2 inches, and less than 1.6 inches.

5. The detachable extension mirror for mounting on the side-view mirror of the transportation device of claim 1, wherein a first minimum circumference of the arm at least one of 80%, 70%, 60%, 50%, 40%, 20%, or 10% of a second minimum circumference of the reflective surface.

6. The detachable extension mirror for mounting on the side-view mirror of the transportation device of claim 1, wherein the portion is elliptical.

7. The detachable extension mirror for mounting on the side-view mirror of the transportation device of claim 1, wherein the portion has a area chosen from the group consisting of less than 12 square inches, less than 10 square inches, less than 8 square inches, less than 6 square inches, less than 4 square inches, and less than 3 square inches.

8. The detachable extension mirror for mounting on the side-view mirror of the transportation device of claim 1, further comprising a rotating adjustment, wherein the constraining element force exerted upon the portion is adjustable by rotating of the rotating adjustment.

9. The detachable extension mirror for mounting on the side-view mirror of the transportation device of claim 1, further comprising a release that forces at least part of the portion away from the target surface whereby vacuum between the portion and the target surface is released.

10. A detachable extension mirror for mounting on a side-view mirror of a transportation device, the detachable extension mirror comprising:
    a mirror housing comprising a reflective surface;
    a suction cup configured to engage the side-view mirror of the transportation device, wherein:
        a portion of the suction cup engages a target surface of the side-view mirror when properly installed, and
        a lip is defined by the distal edge or edges of the portion;
    a constraining element that engages a point proximate to the lip to force at least part of the lip toward the target surface; and
    an arm that couples the suction cup to the reflective surface, wherein:
        the arm extends away from the suction cup, and
        the arm and the mirror housing together weigh less than ten ounces.

11. The detachable extension mirror for mounting on the side-view mirror of the transportation device of claim 10, wherein:
    the target surface of the side-view mirror defines a first plane,
    the arm extends away from a second plane,
    the second plane is defined by a strait-forward direction of the transportation device, the second plane is also defined by being perpendicular to the ground, and the arm extends away from the suction cup at an angle of less than forty-five degrees with respect to either side of the first plane.

12. The detachable extension mirror for mounting on the side-view mirror of the transportation device of claim 10, wherein the constraining element engages a back-side of the portion.

13. The detachable extension mirror for mounting on the side-view mirror of the transportation device of claim 10, wherein a first minimum circumference of the arm at least one of 80%, 70%, 60%, 50%, 40%, 20%, or 10% of a second minimum circumference of the reflective surface.

14. The detachable extension mirror for mounting on the side-view mirror of the transportation device of claim 10, wherein a length of the arm is chosen from the group consisting of greater than 2 inches, greater than 3 inches, greater than 4 inches, greater than 5 inches, greater than 6 inches, greater than 7 inches, greater than 8 inches, and greater that 10 inches.

15. The detachable extension mirror for mounting on the side-view mirror of the transportation device of claim 10, wherein the mirror housing and arm have a combined weight chosen from the group consisting of less than 9 ounces, less than 8 ounces, less than 7 ounces, less than 6 ounces, less than 5 ounces, and less than 4.5 ounces.

16. A detachable extension mirror for mounting on a side-view mirror of a transportation device, the detachable extension mirror comprising:

a mirror housing comprising a reflective surface;

a suction cup configured to engage the side-view mirror of the transportation device, wherein:

a portion of the suction cup engages a target surface of the side-view mirror when properly installed, and a lip is defined by the distal edge or edges of the portion;

a constraining element that engages a point proximate to the lip to force at least part of the lip toward the target surface; and an arm that couples the suction cup to the reflective surface, wherein:

the arm extends away from the suction cup, and a first minimum circumference of the arm is less than eighty percent of a second minimum circumference of the reflective surface.

17. The detachable extension mirror for mounting on the side-view mirror of the transportation device of claim 16, wherein the arm and the mirror housing together weigh chosen from the group consisting of less than 10 ounces, less than 9 ounces, less than 8 ounces, less than 7 ounces, less than 6 ounces, less than 5 ounces, and less than 4.5 ounces.

18. The detachable extension mirror for mounting on the side-view mirror of the transportation device of claim 16, wherein:

the target surface of the side-view mirror defines a first plane, the arm extends away from a second plane, the second plane is defined by a strait-forward direction of the transportation device, the second plane is also defined by being perpendicular to the ground, and the arm extends away from the suction cup at an angle of less than forty-five degrees with respect to either side of the first plane.

19. The detachable extension mirror for mounting on the side-view mirror of the transportation device of claim 16, wherein the first minimum circumference of the arm is selected from the group consisting of less than 5 inches, less than 4 inches, less than 3 inches, less than 2 inches, and less than 1.6 inches.

20. The detachable extension mirror for mounting on the side-view mirror of the transportation device of claim 16, wherein the arm is coupled to the constraining element in at least two places.

* * * * *

UNITED STATES PATENT AND TRADEMARK OFFICE
CERTIFICATE OF CORRECTION

PATENT NO. : 7,150,538 B2  Page 1 of 1
APPLICATION NO. : 11/027614
DATED : December 19, 2006
INVENTOR(S) : John Vander Horst It is certified that error appears in the above-identified patent and that said Letters Patent is hereby corrected as shown below:

In the Specification, correction of the following error is respectfully requested:

In Column 16, line 32, "61" should read --62--

Signed and Sealed this

Tenth Day of April, 2007

JON W. DUDAS
*Director of the United States Patent and Trademark Office*